United States Patent
Takahashi

(10) Patent No.: US 9,503,588 B2
(45) Date of Patent: Nov. 22, 2016

(54) IMAGE DEVICE, IMAGE DEVICE CONTROLLING METHOD, AND PROGRAM

(71) Applicant: CANON KABUSHIKI KAISHA, Tokyo (JP)

(72) Inventor: Seiji Takahashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/523,683

(22) Filed: Oct. 24, 2014

(65) Prior Publication Data

US 2015/0116511 A1  Apr. 30, 2015

(30) Foreign Application Priority Data

Oct. 28, 2013  (JP) .................................. 2013-223527

(51) Int. Cl.
*H04N 5/232* (2006.01)
*H04N 5/225* (2006.01)
*H04N 1/00* (2006.01)

(52) U.S. Cl.
CPC ................. *H04N 1/00156* (2013.01)

(58) Field of Classification Search
None
See application file for complete search history.

(56) References Cited

U.S. PATENT DOCUMENTS

| | | | | |
|---|---|---|---|---|
| 2008/0136930 A1* | 6/2008 | Nagai | ..................... | H04N 5/232 348/222.1 |
| 2009/0153692 A1* | 6/2009 | Koide | ................ | H04N 1/00347 348/222.1 |
| 2010/0087161 A1* | 4/2010 | Young | ..................... | H04N 7/183 455/404.1 |
| 2010/0225962 A1* | 9/2010 | Okigami | ............. | H04L 63/0492 358/1.15 |
| 2011/0074964 A1* | 3/2011 | Hada | ..................... | H04N 1/2112 348/211.2 |
| 2012/0051357 A1* | 3/2012 | Maezawa | ........... | H04N 1/00209 370/389 |
| 2012/0059490 A1* | 3/2012 | Uehara | ................... | A63F 13/10 700/92 |
| 2013/0125212 A1* | 5/2013 | Lee | ..................... | H04N 21/4122 726/4 |

FOREIGN PATENT DOCUMENTS

JP  2009171491 A  7/2009

* cited by examiner

*Primary Examiner* — Aung S Moe
*Assistant Examiner* — Euel Cowan
(74) *Attorney, Agent, or Firm* — Canon U.S.A., Inc. IP Division

(57) ABSTRACT

An image device connected to an external device via a first communication interface and a second communication interface different from the first communication interface, the image device including an image capturing unit that captures an image in response to a shooting instruction, a sharing unit that shares a communication parameter used for connecting the image device to the external device via the first communication interface with the external device via the second communication interface with the external device, a connection unit that connects the image device to the external device via the first communication interface using the communication parameter shared using the sharing unit, and a control unit that controls the sharing unit to start a process for sharing the communication parameter with the external device using the second communication interface according to the shooting instruction.

16 Claims, 17 Drawing Sheets

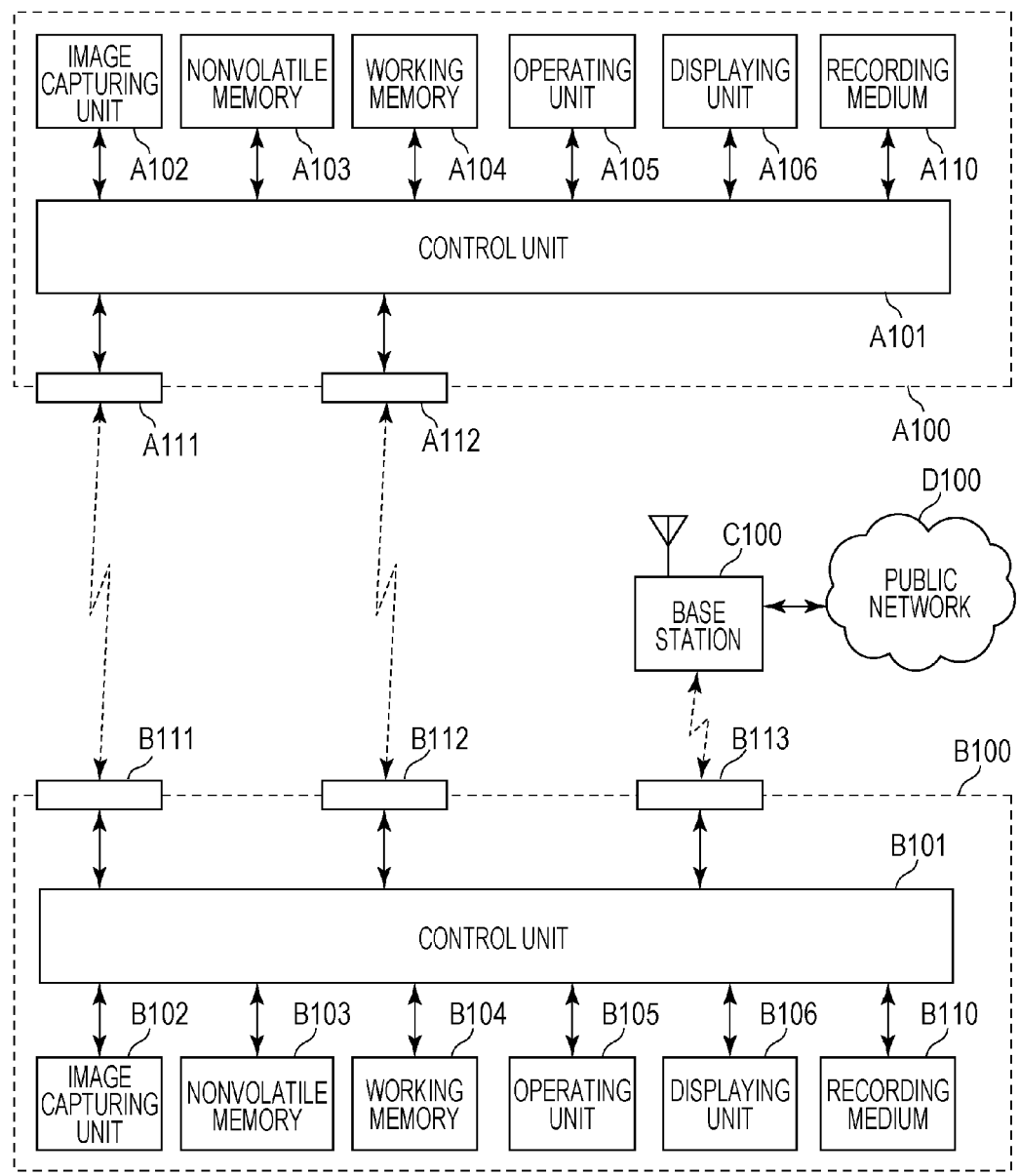

FIG. 7

IMAGE DESTINATION CORRESPONDENCE TABLE 700

| DEVICE ID | OBJECT INFORMATION | |
|---|---|---|
| PHONE_001 | Emily | Lucy |
| PHONE_002 | Johnny | |
| ⋮ | ⋮ | ⋮ |

701 — DEVICE ID
702 — OBJECT INFORMATION

*FIG. 12*

IMAGE DESTINATION CORRESPONDENCE TABLE 1200

| DEVICE ID | RECORD SIZE | |
|---|---|---|
| PHONE_001 | M | S1 |
| PHONE_002 | L | |
| : | : | : |

1201 ... 1202

IMAGE DEVICE, IMAGE DEVICE CONTROLLING METHOD, AND PROGRAM

BACKGROUND

Field

Aspects of the present invention generally relate to an image device capable of wireless communication.

Description of the Related Art

A technology that wirelessly transmits an image to another device by installing a wireless communication function on a digital camera is known in recent years. For example, Japanese Patent Application Laid-Open No. 2009-171491 discloses a digital camera that wirelessly transmits the previously-captured image data to another device using a wireless LAN.

However, it is necessary for the user in Japanese Patent Application Laid-Open No. 2009-171491 to give instructions of the execution of the communication function, for example, by the operation of the menu in order to switch the mode to the communication mode after capturing an image in the image capturing mode. As a method for saving the user from having to do the above, it can be considered that a device is configured to establish a communication with a device to be the destination in advance in order, when an image is captured, to automatically transmit the image to the device. However, even in the configuration described above, the user still has to previously connect the devices before the capture of an image. Furthermore, the configuration is not adequate to change the destination depending on the captured image.

In light of the foregoing, an objective of the present invention is to readily and flexibly implement a sequence of processes from the capture of an image to transmission of the image.

SUMMARY OF THE INVENTION

Aspects of the present disclosure are generally related to readily and flexibly implementing a sequence of processes from the capture of an image to transmission of the image.

According to an aspect of the present disclosure, an image device connected to an external device via a first communication interface and a second communication interface different from the first communication includes an image capturing unit configured to capture an image in response to a shooting instruction, a sharing unit configured to share a communication parameter used for connecting the image device to the external device via the second communication interface with the external device via the first communication interface with the external device, a transmitting unit configured to transmit an image captured with the image capturing unit to the external device via the second communication interface, and a control unit configured to control the sharing unit to start a process for sharing the communication parameter with the external device using the second communication interface according to the shooting instruction.

Further features of the present disclosure will become apparent from the following description of exemplary embodiments with reference to the attached drawings.

BRIEF DESCRIPTION OF THE DRAWINGS

FIG. 1 is a block diagram of a digital camera and a smartphone according to a first embodiment.

FIG. 7 is a conceptual diagram of the information indicating the relationship between the identifier of another device and the object. The information is stored in the digital camera according to the second embodiment.

FIG. 12 is a conceptual diagram of the information stored in the digital camera according to the third embodiment and indicating the relationship between the identifier of another device and an image size.

DESCRIPTION OF THE EMBODIMENTS

Figure 2A:
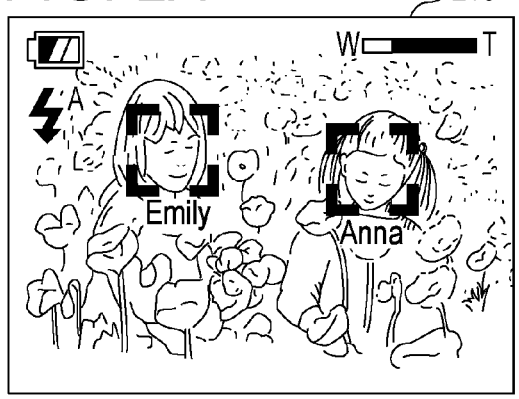
FIGS. 2A and 2B are diagrams of an exemplary screen displayed on the digital camera according to the first embodiment.

Hereinafter, exemplary embodiments will be described in detail using the referenced drawings.

Note that the exemplary embodiments to be described below are examples and can appropriately be modified or changed depending on the configuration of the device, etc. The embodiments can appropriately be combined with each other.

[First Embodiment]

<Configuration of Each Device>

FIG. 1 is a block diagram of the configuration of the entire system using an exemplary communication system.

Note that, although a digital camera and a smartphone are each described as an exemplary image device herein, the image device is not limited to the examples. For example, the image device can be an information processing device such as a mobile media player, a so-called tablet device, or a personal computer.

First, a digital camera A100 will be described.

A control unit A101 controls each unit of the digital camera A100 according to an input signal or a program to be described below. Note that, instead of the control on the entire device with the control unit A101, sharing the processes with a plurality of types of hardware can control the entire device.

An image capturing unit A102 includes, for example, an optical lens unit, an optical system that controls aperture, zoom, or focus, and an image capture device configured to convert the light (image) introduced through the optical lens unit into an electric image signal. A Complementary Metal Oxide Semiconductor (CMOS) or a Charge Coupled Device Image Sensor (CCD) is generally used as the image capture device. Under the control with the control unit A101, the image capturing unit A102 converts the object light formed on the lens included in the image capturing unit A102 into an electric signal using the image capture device, and then performs a noise reduction process or the like in order to output the digital data as the image data. In the digital camera A100 of the present embodiment, the image data is recorded in the recording medium A110 according to the standard of Design rule for Camera File system (DCF).

A nonvolatile memory A103 can electrically erase or record the data. The nonvolatile memory A103 stores, for example, a program that is to be described below and executed in the control unit A101.

A working memory A104 is used as a buffer memory that stores the image data captured with the image capturing unit A102, an image displaying memory of the displaying unit A106, or a working area of the control unit A101.

An operating unit A105 is used for receiving the instructions on the digital camera A100 from the user. The operating unit A105 includes for example, a power source button for the user to give the instructions on ON/OFF of the power source of the digital camera A100, a release switch for the user to give the instructions on the capture of an image, or a reply button for the user to give the instructions of the replay of the image data. The operating unit A105 further includes an operation member such as a dedicated connection button for the start of the communication with an external device through a connection unit A111 to be described below. The operating unit A105 further includes a touch panel formed on a displaying unit A106 to be described below. Note that the release switch (not illustrated in the drawings) includes an SW1 and an SW2. Putting the release switch into a half-stroke turns the SW1 on. This receives the instructions for the preparation for capturing a still image, for example, an auto focus (AF) process, an auto exposure (AE) process AF, an auto white balance (AWB) process, and a flash preliminary emission (EF) process. Putting the release switch into a full-stroke state turns the SW2 on. This receives the instructions for capturing a still image.

The displaying unit A106 displays, for example, a liveview of the still image in a stage of the capturing preparation, the captured still image data, or the words of the conversational operation. Note that the displaying unit A106 is not necessarily embedded in the digital camera A100. The digital camera A100 can be connected not only to the displaying unit A106, for example, provided on the back side of the camera but also to a displaying unit A106 outside the camera, and can include at least a display control function for controlling the display of the displaying unit A106.

The recording medium A110 can record the image data output from the image capturing unit A102. The recording medium A110 can detachably be attached to the digital camera A100 or can be embedded in the digital camera A100. In other words, the digital camera A100 can include at least a means for accessing the recording medium A110.

A connection unit A111 is an interface configured to connect the camera to an external device. The digital camera A100 of the present embodiment can exchange the data with an external device through the connection unit A111. Note that, in the present embodiment, the connection unit A111 includes an interface to communicate with an external device via a so-called wireless LAN in compliance with the standard of IEEE 802.11. The control unit A101 implements the wireless communication with an external device by controlling the connection unit A111.

A short range wireless communication unit A112 includes, for example, an antenna for wireless communication, a modulation/demodulation circuit for processing the wireless signal, and a communication controller. The short range wireless communication unit A112 implements a short range wireless communication in compliance with the standard of IEEE 802.15 (referred to as Bluetooth (registered trademark)) by outputting the modulated wireless signal from the antenna, or by demodulating the wireless signal received at the antenna. In the present embodiment, the Bluetooth® Low Energy version 4.0 that is a low power consumption version is adopted for the communication. The Bluetooth® communication has a narrower communication range than a wireless LAN communication (in other words, has a short communication range.) The Bluetooth® communication is performed at a lower communication rate than a wireless LAN communication. On the other hand, the Bluetooth® communication consumes a lower power than a wireless LAN communication.

The digital camera A100 has been described above.

A smartphone B100 will be described next.

A control unit B101 controls each unit of the smartphone B100 according to an input signal or a program to be described below. Note that, instead of the control on the entire device with the control unit B101, sharing the processes with a plurality of types of hardware can control the entire device.

The image capturing unit B102 includes, for example, an optical lens unit, an optical system that controls aperture, zoom, or focus, and an image capture device configured to convert the light (image) introduced through the optical lens unit into an electric image signal. A CMOS or a CCD is generally used as the image capture device. Under the control with the control unit B101, the image capturing unit B102 converts the object light formed on the lens included in the image capturing unit B102 into an electric signal using the image capture device, and then performs a noise reduction process or the like in order to output the digital data as the image data. In the smartphone B100 of the present embodiment, the image data is recorded in the recording medium B110 according to the standard of DCF.

A nonvolatile memory B103 can electrically erase or record the data. The nonvolatile memory B103 stores, for example, a program to be described below and executed in the control unit B101.

A working memory B104 is used as a buffer memory that stores the image captured with the image capturing unit B102, an image displaying memory of the displaying unit B106, or a working area of the control unit B101.

An operating unit B105 is used for receiving the instructions on the smartphone B100 from the user. The operating unit B105 includes, for example, a power source button for the user to give the instructions on ON/OFF of the power source of the smartphone B100, or an operation button for the user to give the instructions for switching the screen. The operating unit B105 further includes a touch panel formed on a displaying unit B106 to be described below.

A displaying unit B106 displays, for example, the captured still image data, or the Graphical User Interface (GUI) of the conversational operation. Note that the displaying unit B106 is not necessarily embedded in the smartphone B100. The smartphone B100 can include at least a display control function for controlling the contents of the display.

The recording medium B110 can record the image data output from the image capturing unit B102. The recording medium B110 can detachably be attached to the smartphone B100 or can be embedded in the smartphone B100. In other words, the smartphone B100 can include at least a means for accessing the recording medium B110.

A connection unit B111 is an interface to connect the camera to an external device. The smartphone B100 of the present embodiment can exchange the data with an external device through the connection unit B111. Note that, in the present embodiment, the connection unit B111 includes an interface to communicate with an external device via a so-called wireless LAN in compliance with the standard of IEEE 802.11. The control unit B101 implements the wireless communication with an external device by controlling the connection unit B111.

A short range wireless communication unit B112 includes, for example, an antenna for wireless communication, a modulation/demodulation circuit for processing the wireless signal, and a communication controller. The short range wireless communication unit B112 implements a short range wireless communication in compliance with the standard of IEEE 802.15 (referred to as Bluetooth (registered trademark)) by outputting the modulated wireless signal from the antenna, or by demodulating the wireless signal received at the antenna. In the present embodiment, the Bluetooth (registered trademark) Low Energy version 4.0 that is a low power consumption version is adopted for the communication. Note that the characteristics in performance of the Bluetooth (registered trademark) communication in comparison with a wireless LAN communication are the same as in the description of the digital camera A100.

A public wireless communication unit B113 is an interface for implementing a communication using a public network D100 through a base station C100. The public wireless communication unit B113 includes an antenna for wireless communication, a modulation/demodulation circuit for processing the wireless signal, and a communication controller so as to implement a public wireless communication, for example, in compliance with the standard of W-CDMA (UMTS) or Long Term Evolution (LTE).

The smartphone B100 has been described above.

Note that FIG. 1 illustrates an example in which the digital camera A100 can communicate with a smartphone B100. However, the digital camera A100 can communicate with many smartphones B100.

<Schematic System>

Next, a schematic communication system according to the present embodiment will be described with reference to FIG. 2 and FIG. 3.

Figure 2B:
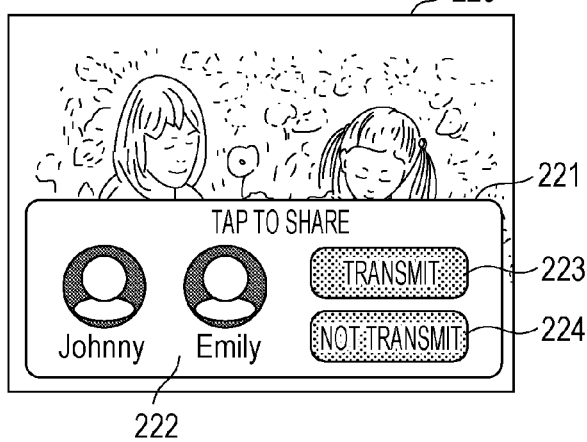
Figure 2C:
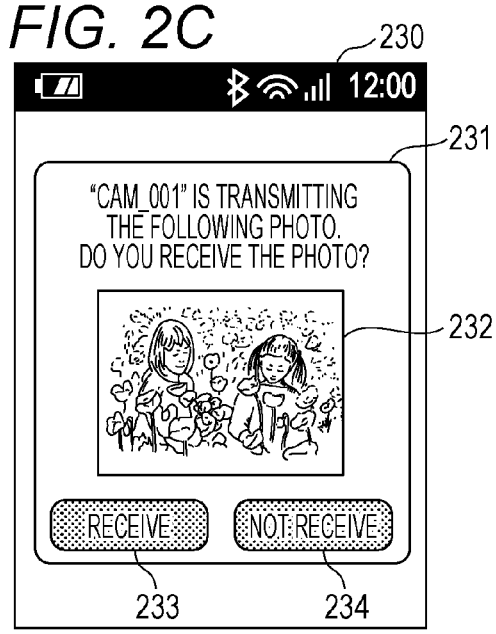
FIG. 2C is a diagram of an exemplary screen displayed on the smartphone according to the first embodiment.

FIG. 2 illustrate exemplary GUIs displayed on the digital camera and the smartphone to implement the communication system according to the present embodiment. FIGS. 2A and 2B are displayed on the displaying unit A106 of the digital camera A100. FIG. 2C is displayed on the displaying unit B106 of the smartphone B100.

Figure 3:
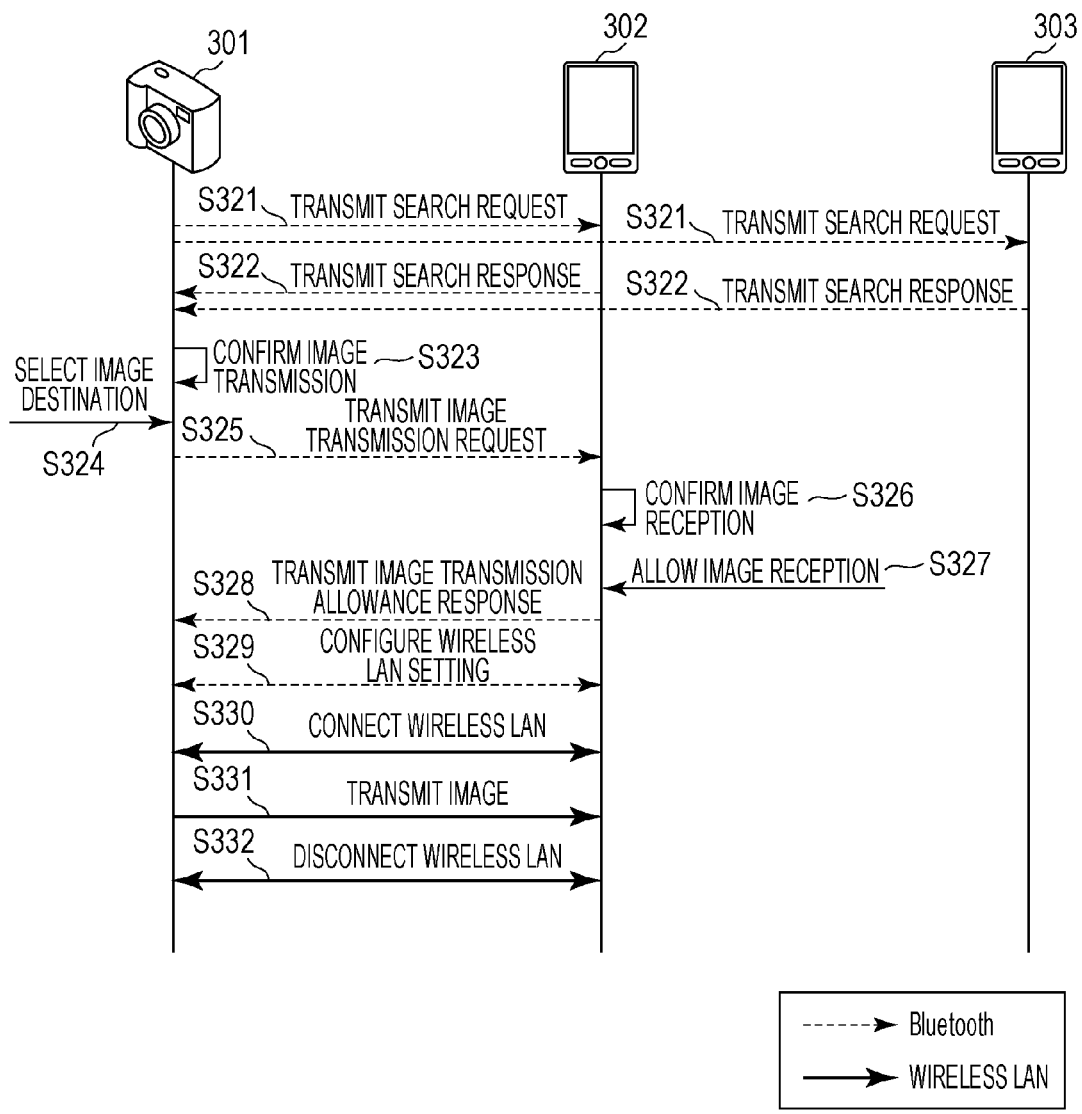
FIG. 3 is a diagram of the sequence describing a schematic procedure of the communication between the digital camera and smartphone according to the first embodiment.

FIG. 3 is a diagram of the sequence of the flow of the processes from the device search to the image transmission in the communication system according to the present embodiment. A digital camera 301 has the same configuration as the digital camera A100. Smartphone 302 and 303 have the same configuration as the smartphone B100. Hereinafter, the components of each device will be described using the same reference signs as in the description of FIG. 1. The dotted arrows used in FIG. 3 show communications in Bluetooth (registered trademark). The boldface arrows used in FIG. 3 show communications in wireless LAN. Note that each of the digital camera and the smartphones can switch the validity and invalidity of the function of each of the Bluetooth (registered trademark) and the wireless LAN based on the user operation. The sequence in FIG. 3 will be described on the assumption that the sequence is started while the functions of both of the Bluetooth (registered trademark) and the wireless LAN are set as valid in all of the devices.

The digital camera 301 starts by receiving the press of the power source button of the operating unit A105. For example, the live-view screen 210 in FIG. 2A is displayed on the displaying unit A106. The images sequentially input from the image capturing unit A102 are displayed in the live-view screen 210. Various types of information or icons are superimposed on the image and displayed. In FIG. 2A, the setting state of the flash, the remaining battery, the state of zoom, and the like are superimposed and displayed. The display/non-display of the information can be switched according to the user operation of the operation of the operation units in the operating unit A105. Thus, the user can capture a desired image while checking the image on the live-view screen 210. The instructions for capturing an image are received with the SW2 of the release switch included in the operating unit A105 as described above.

The digital camera 301 starts the sequence in FIG. 3 in parallel to the execution of the photographing process when the release switch of the operating unit A105 is pressed and the SW2 is turned on.

First, in step S321, the digital camera 301 broadcasts a search request (namely, advertisement) to the peripheral devices via Bluetooth (registered trademark). At that time, the digital camera 301 transmits the search request after adding the information capable of uniquely specifying its own device (the device ID) to the search request.

After receiving the search request, each of the smartphones 302 and 303 transmits a search response to the digital camera 301 via Bluetooth (registered trademark) in step S322. At that time, each of the smartphone 302 and 303 transmits the search response after adding the information indicating its own device (for example, the device ID or the user name set on the device) to the search response.

After receiving the search response transmitted from the smartphone, the digital camera 301 displays the transmission confirmation window 220 illustrated in FIG. 2B on the displaying unit A106 in step S323. At that time, the dialog box 221 for selecting the device to which the image is to be transmitted is superimposed and displayed together with the captured image in the transmission confirmation window 220 of the digital camera 301. The digital camera 301 displays the destination list 222, the transmission allowance icon 223, and the transmission rejection icon 224 in the dialog box 221. The destination list 222 is displayed based on the information added to the search response in step S322. In other words, in the example of FIG. 2, the search responses are transmitted from the smartphones of Johnny and Emily, and the devices that are the destinations are listed using the character strings "Johnny" and "Emily" that are the user names added to the search responses.

When one or more devices that are the image destinations are selected from the destination list 222 and the transmission allowance icon 223 is further selected (step S324), the digital camera 301 transmits the image transmission request to the selected devices via Bluetooth (registered trademark) (step S325). At that time, the digital camera 301 transmits the image transmission request after adding the reduced image (namely, the thumbnail) of the captured image to the image transmission request. On the other hand, when the transmission rejection icon 224 is selected by the touch panel operation with the operating unit A105, the digital camera 301 terminates the process in the present sequence to return to the live-view screen 210.

Hereinafter, the case in which the smartphone 302 is selected in step S324 will be described as an example. Note that a plurality of devices can be selected as the image destinations in step S324. In such a case, the processes in and after step S325 are performed with the devices.

When receiving the image transmission request, the smartphone 302 displays an image reception confirmation window 230 illustrated in FIG. 2C in step S326. At that time, the smartphone 302 displays a reduced image 232 added to the image transmission request in a dialog box 231. This causes the user of the smartphone 302 to notice the fact that the digital camera 301 is to transmit the main image of the contents of the displayed reduced image 232. When receiving the selection of a reception allowance icon 233 with the touch panel of the operating unit B105 (step S327), the smartphone 302 transmits an image transmission allowance response to the digital camera 301 via Bluetooth (registered trademark) (step S328). On the other hand, when receiving the selection of a reception rejection icon 234, the smartphone 302 transmits an image transmission rejection response to the digital camera 301 via Bluetooth (registered trademark) and terminates the process in the present sequence.

When the digital camera 301 receives the image transmission allowance response transmitted from the smartphone 302, the digital camera 301 and the smartphone 302 share the communication parameter necessary for a wireless LAN connection with each other via Bluetooth (registered trademark) (step S329).

In next step S330, the digital camera 301 and the smartphone 302 establish a wireless LAN connection based on the shared communication parameter.

Next, in step S331, the digital camera 301 transmits the captured image to the smartphone 302 via the wireless LAN.

After the completion of the image transmission in step S331, the digital camera 301 and the smartphone 302 disconnects the communication via the wireless LAN in step S332.

It is not necessary for the user to separately perform the operation for capturing an image and the operation for the communication because the communication with the peripheral devices is started according to the image capture as described above. Thus, the user can capture an image and transmit the image with a seamless operational feeling. Furthermore, the search for the communication partner is performed at the timing of the image capture via Bluetooth (registered trademark) in the present embodiment. This saves the user from having to previously establish a communication with the communication partner before the image capture. Searching for the communication partner not via the wireless LAN but via Bluetooth (registered trademark) can further reduce the power consumption. In addition, a smooth image transmission can be implemented because the wireless LAN at a higher communication rate is used for transmitting the image.

<Operation of Each Device>

First, the photographing process in the digital camera A100 performed in parallel to the start of the operation described above will be described.

Figure 16:
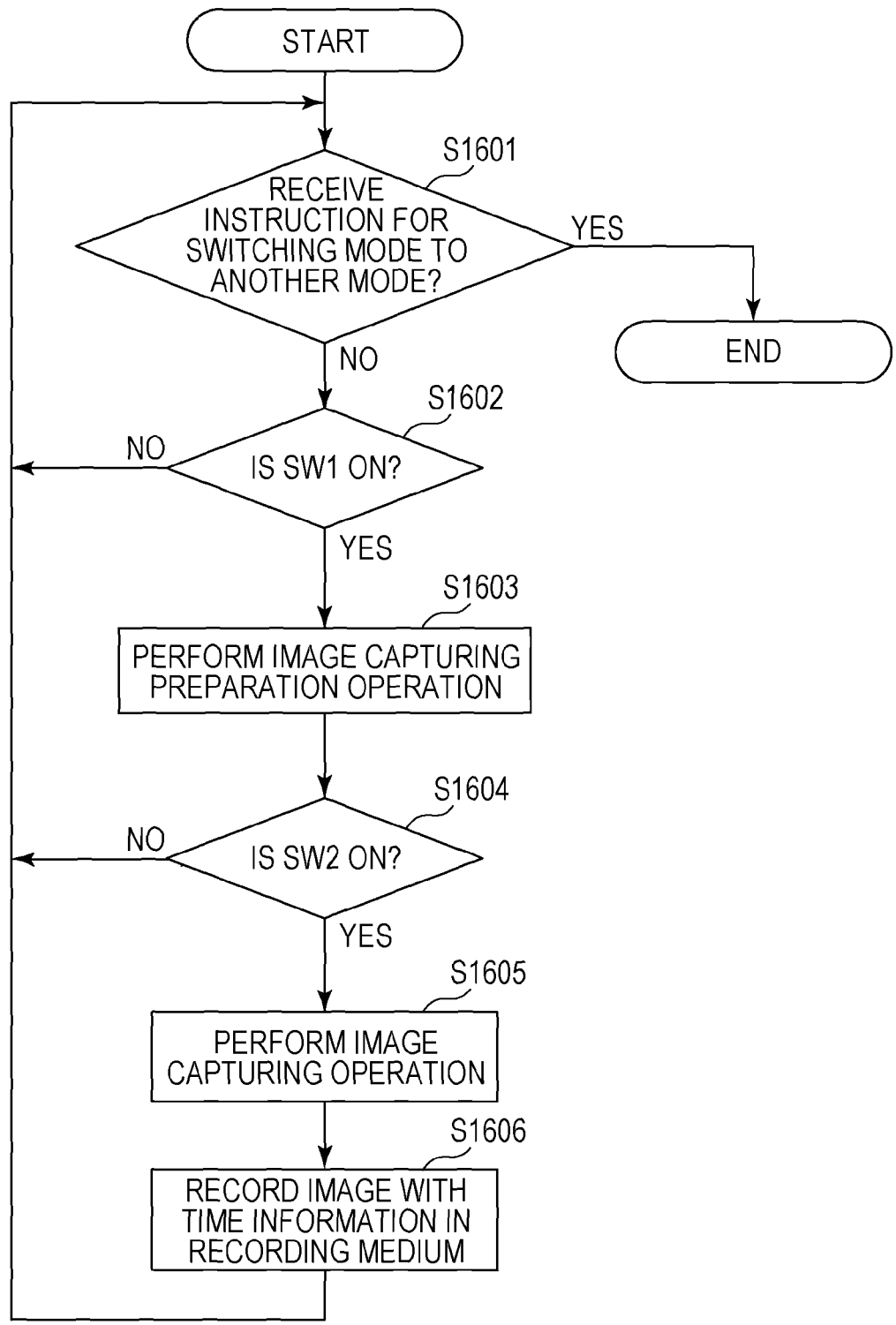
FIG. 16 is a flowchart of the operation of the digital camera in the image capturing mode according to the first embodiment.

FIG. 16 is a flowchart describing the operation of the digital camera A100 in an image capturing mode. The control unit A101 of the digital camera A100 controls each unit of the digital camera A100 according to the input signal or a program. This implements the process described in the present flowchart. The process of the flowchart in FIG. 16 is started together with the display of the live views that are sequentially captured once the instructions for starting the image capturing mode are received, for example, by the user operation.

First, in step S1601, the control unit A101 determines whether the operating unit has received the instructions for switching the mode into another mode. When determining that the operating unit has received the instructions for switching the mode into another mode, the control unit A101 terminates the process in the present flowchart. On the other hand, when the control unit A101 determines that the operating unit has not received the instructions for switching the mode into another mode, the process goes to step S1602.

Next, in step S1602, the control unit A101 determines whether the SW1 of the release switch is turned on. When the control unit A101 determines that the SW1 of the release switch is not ON, the process goes back to step S1601. On the other hand, when the control unit A101 determines that the SW1 of the release switch is ON, the process goes to step S1603.

In step S1603, the control unit A101 performs an image-pickup preparation operation.

Next, in step S1604, the control unit A101 determines whether the SW2 is ON. When the control unit A101 determines that the SW2 is not ON, the process goes back to step S1601. On the other hand, when the control unit A101 determines that the SW2 is ON, the process goes to step S1605.

In step S1605, the control unit A101 performs an image capturing operation to generate an image.

In next step S1606, the control unit A101 records the image generated in step S1604 in a recording medium. After that, the process goes back to step S1601.

The flowchart describing the operation of the digital camera A100 in the image capturing mode in the present embodiment has been described above.

Next, the operation of the digital camera for implementing the procedure in FIG. 3 will be described in detail with reference to FIG. 4.

Figure 4:
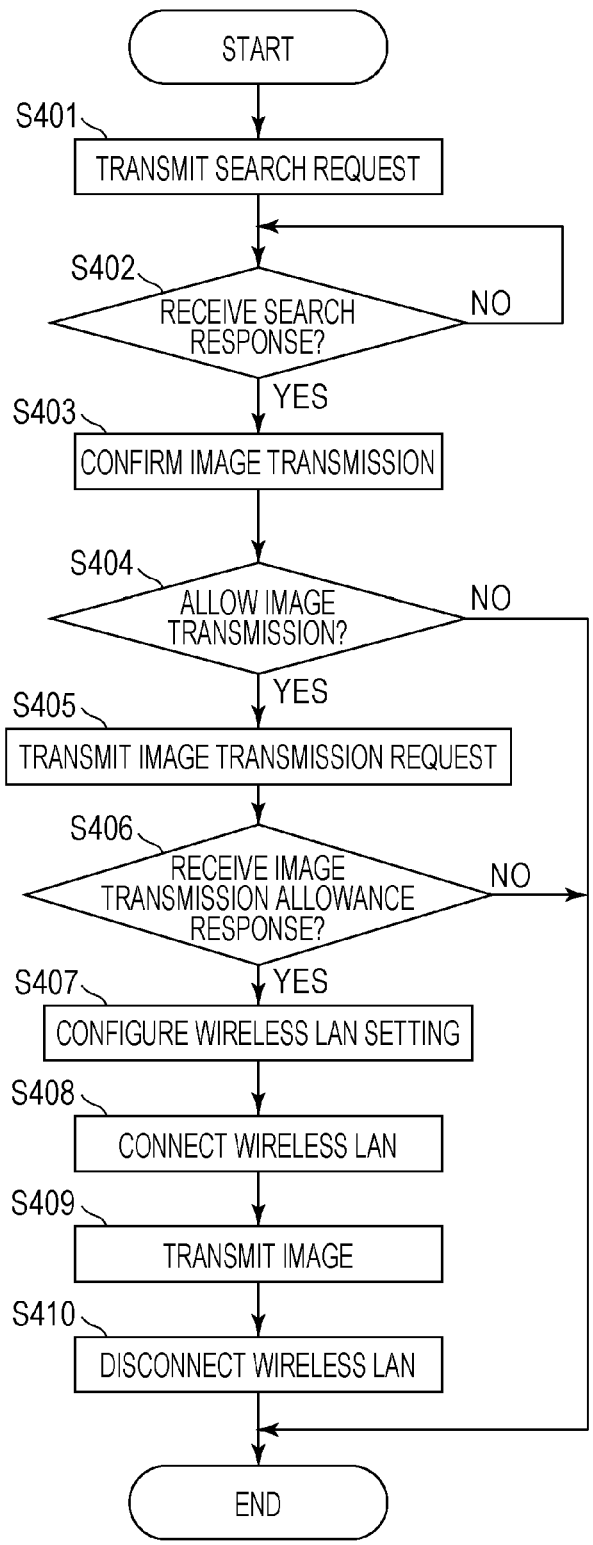
FIG. 4 is a flowchart of the operation of the digital camera according to the first embodiment.

FIG. 4 is a flowchart describing the operation of the digital camera A100 in the present embodiment. Note that the control unit A101 of the digital camera A100 controls each unit of the digital camera A100 according to the input signal or a program. This implements the process described in the present flowchart. In absence of any description, the process in the flowchart describing the operation of the digital camera A100 to be described below is implemented in the same manner as described above. The process described in the flowchart in FIG. 4 is started, for example, when the control unit A101 detects the fact that the SW2 is ON in step S1604 in FIG. 16 while the functions of the Bluetooth (registered trademark) and wireless LAN of the digital camera A100 are valid. At that time, the process described in the flowchart in FIG. 4 is started in parallel to the processes in and after step S1605.

In step S401, the control unit A101 broadcasts a search request (namely, advertisement) to the peripheral devices through the short range wireless communication unit A112. At that time, the control unit A101 transmits the search request after adding the information capable of uniquely specifying its own device (the device ID) to the search request. The process in the present step corresponds to the process in step S321 in FIG. 3.

In step S402, the control unit A101 determines whether the control unit has received the search response through the short range wireless communication unit A112. When the control unit A101 determines that the control unit has not received the search response, the process in the present step is repeated to wait for the reception of the search response. On the other hand, when the control unit A101 determines that the control unit has received the search response, the process goes to step S403. The process in the present step corresponds to the process in step S322 in FIG. 3.

In step S403, the control unit A101 displays the transmission confirmation window 220 as illustrated in FIG. 2B on the displaying unit A106. In that case, the control unit A101 displays the image data generated in step S1605 in FIG. 16 performed in parallel. In addition, the control unit A101 controls the displaying unit A106 to display the destination list 222 in the dialog box 221 based on the information added to the search response (for example, the device ID or the user name set on the device). The process in the present step corresponds to the process in step S323 in FIG. 3.

In step S404, the control unit A101 determines whether the operating unit has received the operation for allowing the image transmission through the touch panel of the operating unit A105. When the control unit A101 determines that the transmission allowance icon 223 has been selected while one or more devices that are the image destinations are selected from the destination list 222 through the touch panel of the operating unit A105 for the image transmission, the process goes to step S405. On the other hand, when the control unit A101 determines that the transmission rejection icon 224 has been selected through the touch panel of the operating unit A105, the process in the present flowchart is terminated.

Note that when none of the devices currently displayed in the destination list 222 has been selected, the control unit A101 can control the operating unit A105 and the displaying unit A106 to disable the selection of the transmission allowance icon 223. For example, the transmission allowance icon 223 is not displayed. Alternatively, the transmission allowance icon 223 is displayed in a gray-out state such that the touch operation on the display area in the allowance icon 223 is ignored.

In step S405, the control unit A101 transmits the image transmission request to the device selected in step S404 through the short range wireless communication unit A112. The control unit A101 transmits the image transmission request after adding the reduced image of the captured image to the image transmission request. The process in the present step corresponds to the process in step S325 in FIG. 3.

In step S406, the control unit A101 determines whether the device that has transmitted the image transmission request in step S405 has allowed the image transmission.

When it is determined that the control unit has received the image transmission allowance response from the device through the short range wireless communication unit A112, the process goes to step S407. On the other hand, when the control unit has received the image transmission rejection response from the device through the short range wireless communication unit A112, or when the control unit has not received the image transmission allowance response in a predetermined period of time, the control unit A101 terminates the process in the present flowchart.

In step S407, the control unit A101 transmits and receives the communication parameter necessary for a wireless LAN communication through the connection unit A111 with the device that is the image destination of which image transmission allowance response has been received in step S406 through the short range wireless communication unit A112. The process in the present step corresponds to the process in step S329 in FIG. 3.

In step S408, the control unit A101 establishes a wireless LAN connection with the image destination device through the connection unit A111 based on the communication parameter received in step S407. The process in the present step corresponds to the process in step S330 in FIG. 3.

In step S409, the control unit A101 transmits the captured image to the image destination device through the connection unit A111. The process in the present step corresponds to the process in step S331 in FIG. 3.

In step S410, the control unit A101 disconnects the communication with the image destination device through the connection unit A111. The process in the present step corresponds to the process in step S332 in FIG. 3.

The operation of the digital camera A100 in the present embodiment has been described above.

Next, the operation of the smartphone for implementing the operation described above will be described in detail with reference to FIG. 5.

Figure 5:
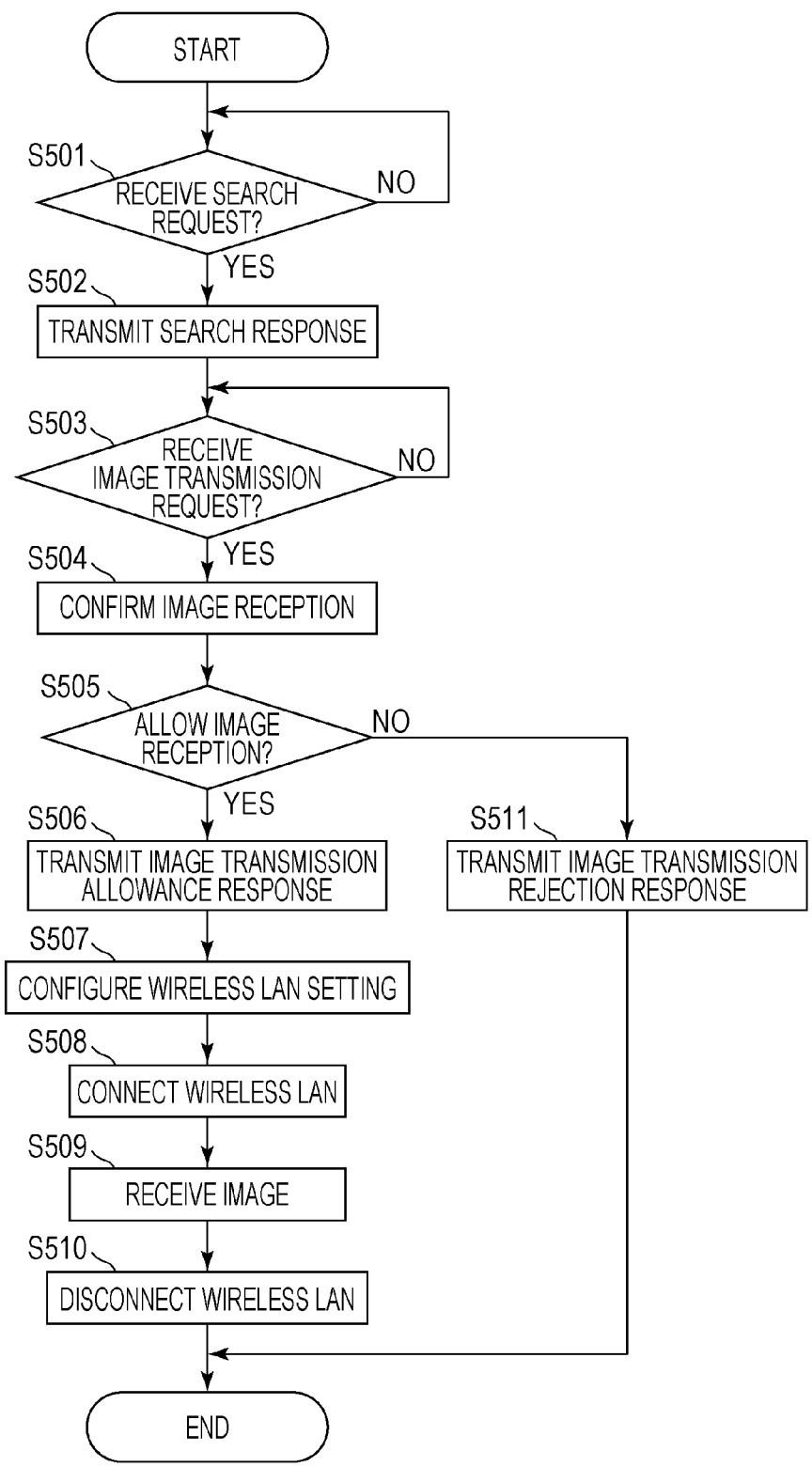
FIG. 5 is a flowchart of the operation of the smartphone according to the first embodiment.

FIG. 5 is a flowchart describing the operation of the smartphone B100 in the present embodiment. Note that the control unit B101 of the smartphone B100 controls each unit of the smartphone B100 according to the input signal or a program. This implements the process described in the present flowchart. In absence of any description, the process in the flowchart describing the operation of the smartphone B100 to be described below is implemented in the same manner as described above.

The process in the flowchart in FIG. 5 is started when the operation for allowing the reception of the search request is received through the operating unit B105. Specifically, the function of the Bluetooth (registered trademark) and the function of the wireless LAN are set as valid on the OS installed on the smartphone B100, for example, according to the menu operation from the user. This leads to a state in which the reception of a search request from an external device is waited. The flowchart in FIG. 5 is started. In absence of any description, the process in the flowchart describing the operation of the smartphone B100 to be described below is implemented in the same manner as described above.

In step S501, the control unit B101 determines whether the control unit has received a search request through the short range wireless communication unit B112. When the control unit B101 determines that the control unit has not received a search request, the process in the present step is repeated to wait for a reception of the search request. On the other hand, when the control unit B101 determines that the control unit has received the search request, the process goes to step S502.

In step S502, the control unit B101 transmits a search response through the short range wireless communication unit B112 to the device that has transmitted the search request. At that time, the control unit B101 specifies the device that is the image source based on the device ID included in the search request. The control unit B101 further transmits the search response after adding the information indicating its own device (for example, the device ID or the user name set on the device) to the search response. The process in the present step corresponds to the process in step S322 in FIG. 3.

In step S503, the control unit B101 determines whether the control unit has received the image transmission request from the image source device through the short range wireless communication unit B112. When the control unit B101 determines that the control unit has not received the image transmission request, the process in the present step is repeated to wait for the reception of the image transmission request. On the other hand, when the control unit B101 determines that the control unit has received the image transmission request, the process goes to step S504.

In step S504, the control unit B101 displays the image reception confirmation window 230 as illustrated in FIG. 2B on the displaying unit B106. The control unit B101 controls the displaying unit B106 to display the reduced image 232 added to the image transmission request in step S325 in the dialog box 231. The process in the present step corresponds to the process in step S326 in FIG. 3.

In step S505, the control unit B101 determines whether the operating unit has received the operation for allowing the image reception through the touch panel of the operating unit B105. When the control unit B101 determines that the operating unit has received the selection of the reception rejection icon 234, the process goes to step S511. In step S511, the control unit B101 transmits the image transmission rejection response to the image source device through the short range wireless communication unit B112. After that the process is terminated.

On the other hand, the control unit B101 determines that the operating unit has received the selection of the reception allowance icon 233 through the touch panel of the operating unit B105, the process goes to step S506.

In step S506, the control unit B101 transmits the image transmission allowance response to the image source device through the short range wireless communication unit B112. The process in the present step corresponds to the process in step S328 in FIG. 3.

In step S507, the control unit B101 transmits and receives the communication parameter necessary for a wireless LAN communication through the connection unit B111 with the image source device through the short range wireless communication unit B112. The process in the present step corresponds to the process in step S329 in FIG. 3.

In step S508, the control unit B101 establishes a wireless LAN connection with the image source device through the connection unit B111 based on the communication parameter received in step S507. The process in the present step corresponds to the process in step S330 in FIG. 3.

In step S509, the control unit B101 receives the captured image from the image source device through the connection unit B111.

In step S510, the control unit B101 disconnects the communication with the image source device through the connection unit B111. The process in the present step corresponds to the process in step S332 in FIG. 3.

The operation of the smartphone B100 in the present embodiment has been described above.

Note that the digital camera A100 in the present embodiment displays the screen for confirming the image transmission after waiting for the reception of the search response. In light of that, if the image capture is completed before the search response, the REC review window of the captured image can be displayed. In that case, the dialog is popped up on the background of the display of the REC review in response to the reception of the search response. In other words, in absence of the search response, the user captures the next image after checking the REC review without checking the dialog.

In the present embodiment, the case in which turning the SW2 on triggers the start of the search for the peripheral device using Bluetooth (registered trademark) has been described as an example. Any operation relating to the photographing process can be the trigger even at another timing. For example, turning the SW1 on can trigger the start of the search for the peripheral device using Bluetooth (registered trademark). In that case, the search for the peripheral device using Bluetooth (registered trademark) is started, for example, in response to the detection of the fact that the SW1 is turned on in step S1602 in FIG. 16. Then, the search response to the search request is received on the background. After that, when the SW2 is turned on and the photographing process is performed, the screen of the transmission confirmation is displayed while working as the REC review of the image obtained in the photographing process. Note that when the SW2 is not turned on and the SW1 is turned off after the SW1 has been turned on, the search response that has been received until then is discarded. In other words, on the transmission confirmation window of the image obtained in the photographing process executed after the SW2 has been turned on, only the device responds to the search request of which transmission has been triggered by the fact that the SW1 has been turned on is displayed on the destination list.

In addition to the operation in the present embodiment, the process for periodically transmitting a search request using Bluetooth (registered trademark) can be started in response to the fact that the SW1 or SW2 is turned on. In other words, the process for periodically executing the process in step S401 in FIG. 4 is started in response to the detection of the fact that the SW1 is ON in step S1602 in FIG. 16, or the fact that the SW2 is ON in step S1604 in FIG. 16. This is because there is a possibility that another device newly enters the range in which the camera can communicate the device while the selection of the destination by the user is waited on the transmission confirmation window. In that case, the user name included in the response newly received is added and displayed in the currently-displayed destination list in response to the reception of the search response during the display of the destination list. Note that the periodic execution of the process in step S401 is stopped, for example, when it is determined in step S404 in FIG. 4 that the operation for allowing the image transmission has been received.

When the release switch is pressed during the display of the transmission confirmation window and the SW1 or SW2 is turned on from off, all of the processes in the flowchart in FIG. 4 are cancelled so as to capture the next image. In other words, the processes are restarted from step S401 in the flowchart in FIG. 4. This can reduce the possibility that a photo opportunity is missed. Note that, if the fact that the SW1 or SW2 is turned on is detected while the selection of the destination is completed, a transmission request can automatically be transmitted to the destination while the process goes to a process for capturing the next image.

As described above, the digital camera A100 in the present embodiment starts the search for the peripheral devices using Bluetooth (registered trademark) in wake of receiving the shooting instruction. This can omit the operation in which the user consciously instructs the search.

[Second Embodiment]
<Schematic System>

In the first embodiment, the case in which the digital camera starts the search for the peripheral devices using Bluetooth (registered trademark) in wake of receiving the shooting instruction and the image transmission destination device is selected by the user operation has been described as an example.

On the other hand, in the present embodiment, the case in which the image destination device is automatically determined according to the captured image will be described. When the destination is identified by the determination, the image is automatically transmitted. On the other hand, when the destination is unknown, device registration is performed to automatically determine the destination in addition to the process described in the first embodiment. Note that the present embodiment has many points in common with the first embodiment. Thus, unique points to the present embodiment will mainly be described.

The communication system in the present embodiment will schematically be described with reference to FIGS. 6 to 8.

FIG. 6 are exemplary GUIs displayed on the digital camera and the smartphone in order to implement the communication system in the present embodiment. FIGS. 6A to 6C are displayed on the displaying unit A106 of the digital camera A100. FIGS. 6D and 6E are displayed on the displaying unit B106 of the smartphone B100. Note that the same contents as in FIG. 2 are marked with the same reference signs and the descriptions will be omitted.

FIG. 7 is exemplary information that is to be referred to when the digital camera A100 automatically determines the image destination device. The correspondence relationship between a device ID 701 of the destination device of the captured image and the object information 702 included in the captured image is recorded in the image destination correspondence table 700. The image destination correspondence table 700 is stored in the nonvolatile memory A103.

Figure 8:
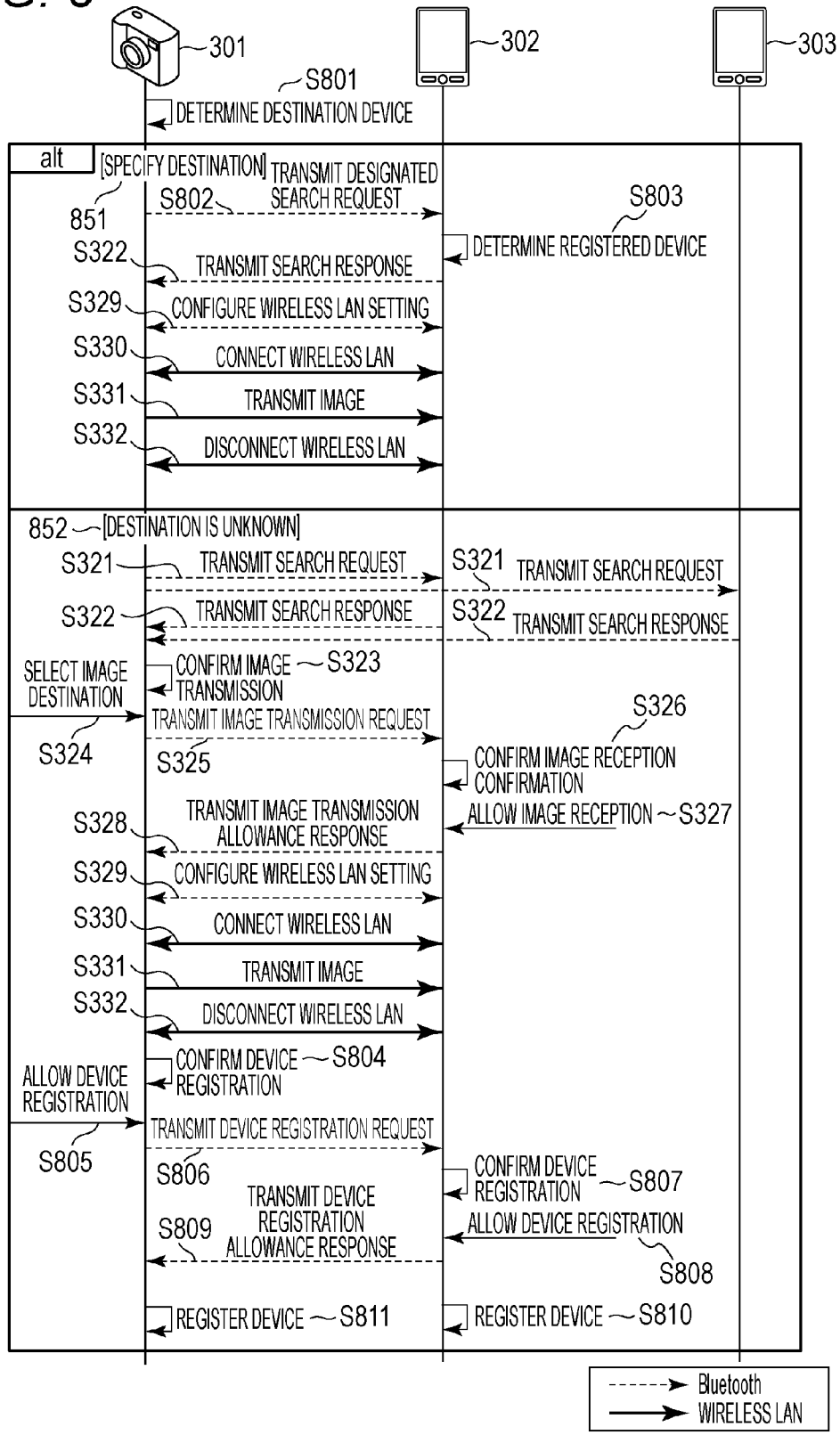
FIG. 8 is a diagram of the sequence describing the schematic procedure of the communication between the digital camera and smartphone according to the second embodiment.

FIG. 8 is a diagram of the sequence of the flow of the processes from the device search to the image transmission and the registration of the image destination device in the communication system according to the present embodiment. Note that the same contents as in FIG. 3 are marked with the same reference signs and the descriptions will be omitted.

The digital camera 301 starts the sequence in FIG. 8 with the photographing process when the release button of the operating unit A105 is pressed and the SW2 is turned on.

First, in step S801, the digital camera 301 specifies the image destination device based on the object on the image generated in the photographing process. Specifically, analyzing the image generated in the photographing process recognizes the object included in the image. Then, the image destination device is determined with reference to the information about the object recognized from the image and an image destination correspondence table 700. For example, when the objects "Emily" and "Anna" are recognized on the captured image by the human figure authentication while the image is captured, the digital camera 301 specifies the device ID of the image destination device as "PHONE_001" from the image destination correspondence table 700. Alternatively, when an object is not recognized or when the recognized object has not been registered (in other words, when the information about the recognized object is not recorded in the image destination correspondent table), the digital camera 301 determines that the image destination device is unknown.

Note that, instead of the analysis of the image generated in the photographing process, the result from the object recognition that is appropriately performed on the display of the live-view image can be used. In that case, the information about the object recognized at the time when the SW2 is turned on is used. This can specify the image destination device without waiting for the generation of the image in the photographing process, and thus can progress the process smoothly.

When the image destination device is identified in step S801, the sequence goes to the sequence 851. When it is determined that the image destination device is unknown, the sequence goes to the sequence 852.

First, the case in which the image destination device is identified (when the sequence goes to the sequence 851) will be described. The case in which the device that has been determined as the destination is the smartphone 302 will be described as an example.

In step S802, the digital camera 301 transmits a designated search request to the smartphone 302 via Bluetooth (registered trademark). In other words, the digital camera 301 does not broadcast the search request but unicasts the search request to the smartphone 302. Note that, if a plurality of devices is specified as the destinations, the designated search request is transmitted to each of the smartphones via multicast. In that case, the digital camera 301 transmits the search request after adding the information capable of uniquely specifying its own device (the device ID) to the search request.

When receiving the designated search request, the smartphone 302 determines in step S803 whether the device ID added to the request has been registered. The smartphone 302 refers to the registered device ID list (not illustrated in the drawings) stored in the nonvolatile memory B103. When the device ID added to the designated search request is included in the list, the smartphone 302 determines that the device ID has been registered. When the device ID added to the designated search request is not included in the list, the smartphone 302 determines that the device ID has not been registered.

When it is determined that the device ID has been registered, the smartphone 302 transmits the search response to the digital camera 301 via Bluetooth (registered trademark) in step S322. On the other hand, when the device ID has not been registered, the smartphone 302 terminates the process for the image transmission.

After step S322, the digital camera 301 and the smartphone 302 perform the processes for transmitting the captured image in steps S329 to S332.

Next, the case in which the image destination device is unknown as the result of step S801 (when the sequence goes to the sequence 852) will be described.

The digital camera 301 and the smartphones 302 and 303 perform the processes for transmitting the image in steps S321 to S332, similarly to in FIG. 3. In other words, the image transmission process is performed in the same process as the first embodiment. Note that in the present embodiment, the case in which the image source is the digital camera 301 and the image destination is the smartphone 302 will be described as an example.

In the present embodiment, after step S332, namely, after the completion of the image transmission process, the process for registering the devices that have performed the current communication.

Figure 6A:
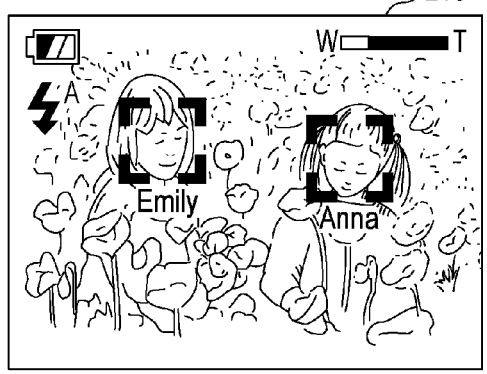
FIGS. 6A, 6B, and 6C are diagrams of an exemplary screen displayed on a digital camera according to a second embodiment.
Figure 6B:
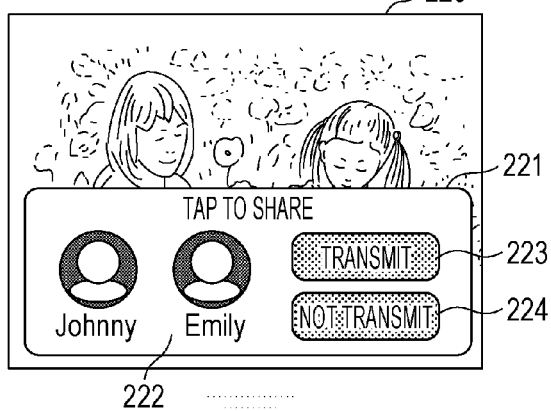
Figure 6C:
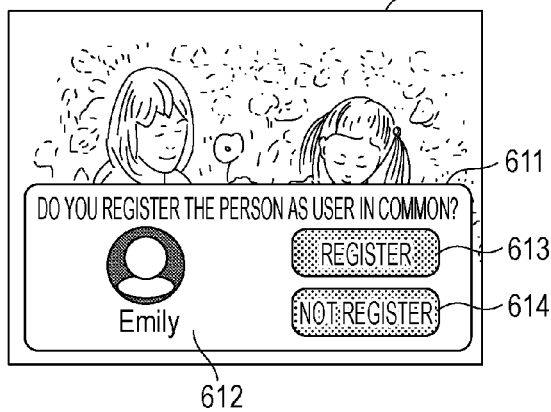
Figure 6D:
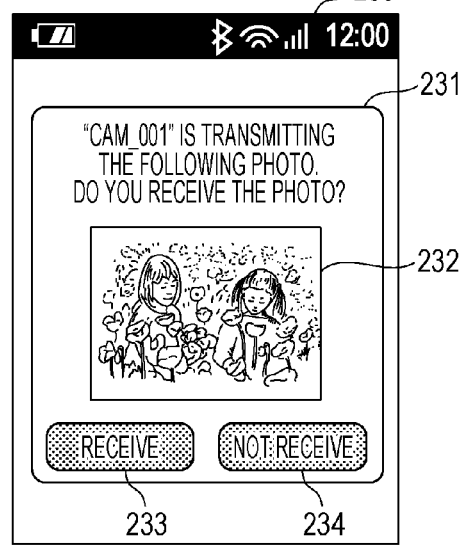
FIGS. 6D and 6E are diagrams of an exemplary screen displayed on a smartphone according to a second embodiment.

In other words, in step S804, the digital camera 301 displays a device registration window 610 illustrated in FIG. 6C on the displaying unit A106. The digital camera 301 superimposes and displays a dialog box 611 for registering the image destination device in addition to the transmitted image in the device registration window 610. The digital camera 301 displays destination device information 612, a registration allowance icon 613, and a registration rejection icon 614 in the dialog box 611.

When the registration allowance icon 613 is selected by the touch panel operation of the operating unit A105 (step S805), the digital camera 301 transmits the device registration request to the smartphone 302 via Bluetooth (registered trademark) (step S806). On the other hand, when the registration rejection icon 614 is selected, the digital camera 301 terminates the process for registering the image destination device to return to the live-view screen 210.

Figure 6E:
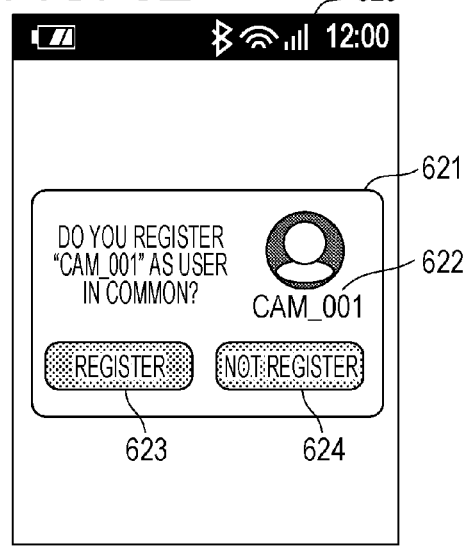

When receiving the device registration request, the smartphone 302 displays the device registration window 620 as illustrated in FIG. 6E on the displaying unit B106 in step S807. The smartphone 302 superimposes and displays a dialog box 621 for registering the image source device in the device registration window 620. The smartphone 302 displays transmission source device information 622, a registration allowance icon 623, and a registration rejection icon 624 in the dialog box 621.

When the registration allowance icon 623 is selected by the touch panel operation of the operating unit B105 (step S808), the smartphone 302 transmits a device registration allowance response to the digital camera 301 via Bluetooth (registered trademark) (step S809). On the other hand, when the registration rejection icon 624 is selected, the smartphone 302 transmits a device registration rejection response to the digital camera 301 via Bluetooth (registered trademark) to terminate the process for registering the image source device.

After transmitting the device registration allowance response, the smartphone 302 registers the digital camera 301. Specifically, the smartphone 302 additionally records the device ID of the digital camera 301 in the registered device ID list (not illustrated in the drawings).

After receiving the device registration allowance response, the digital camera 301 registers the smartphone 302 in step S811. Specifically, the digital camera 301 additionally records the device ID of the smartphone 302 and the object information included in the captured image in the image destination correspondence table 700.

<Operation of Each Device>

Next, the operation of the digital camera for implementing the operation described above will be described in detail with reference to FIG. 9.

Figure 9:
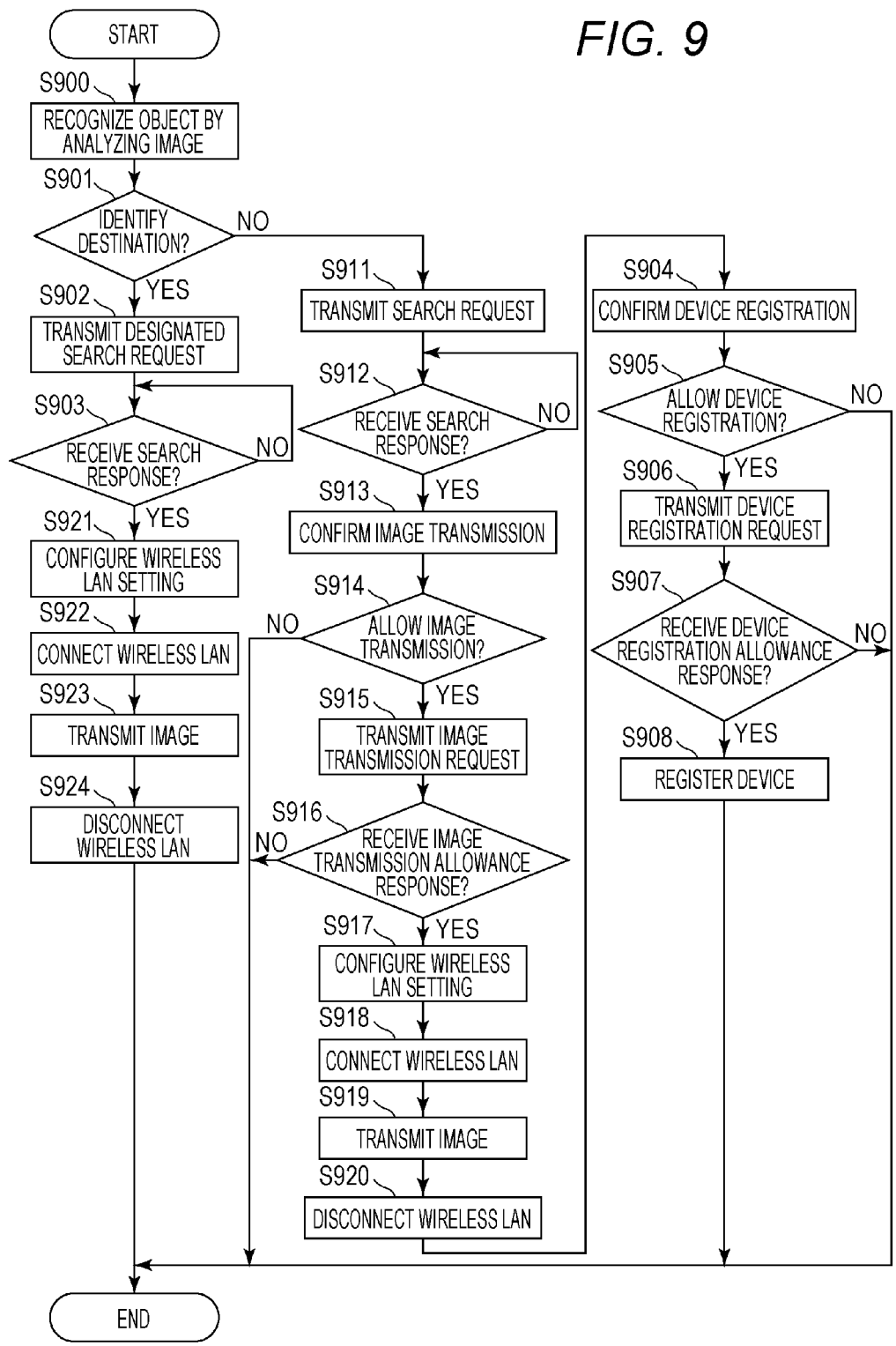
FIG. 9 is a flowchart of the operation of the digital camera according to the second embodiment.

FIG. 9 is a flowchart describing the process of the digital camera A100 in the present embodiment.

First, in step S900, analyzing the image generated in the photographing process recognizes the object. Note that, when the object recognition has been completed at the timing of the display of the live-view image and the recognition result is used as described above, the present step is not performed.

In step S901, the control unit A101 determines the image destination device with reference to the information about the recognized object and the image destination correspondence table 700. The processes in step S900 and step S901 correspond to the process in step S801 in FIG. 8.

First, the case in which the image destination device is determined in step S901 will be described. In that case, the process goes to step S902.

In step S902, the control unit A101 transmits a designated search request through the short range wireless communication unit A112 to the image destination device determined in step S901. The process in step S902 corresponds to the process in step S802 in FIG. 8.

In step S903, the control unit A101 determines whether the control unit has received the search response from the image destination device through the short range wireless communication unit A112. The control unit A101 determines that the control unit has not received the search response, the process in the present step is repeated to wait for a search response. On the other hand, when the control unit A101 determines that the control unit has received the search response, the process goes to step S921.

In step S921 to step S924, the same processes as in step S407 to step S410 in FIG. 4 are performed.

The case in which the image destination device is specified in step S901 has been described above.

Next, the case in which the image destination device is not specified in step S901 will be described. In that case, the process goes to step S911.

In step S911 to step S920, the same processes as in step S401 to step S410 in FIG. 4 are performed. When the process in step S920 is completed, the process goes to step S904.

In step S904, the control unit A101 displays the device registration window 610 illustrated in FIG. 6C on the displaying unit A106. The control unit A101 controls the displaying unit A106 to superimpose and display the dialog box 611 for registering the image destination device together with the captured image in the device registration window 610. The control unit A101 controls the displaying unit A106 to display the destination device information 612, the registration allowance icon 613, and the registration rejection icon 614 in the dialog box 611.

In step S905, the control unit A101 determines whether the operating unit has received the operation for registering the image destination device with the touch panel of the operating unit A105. When the control unit A101 determines that the operating unit has received the operation for selecting the registration allowance icon 613, the process goes to step S906. When the control unit A101 determines that the operating unit has received the operation for selecting the registration rejection icon 614, the process in the present flowchart is terminated.

In step S906, the control unit A101 transmits the device registration request to the image destination device through the short range wireless communication unit A112. The process in the present step corresponds to the process in step S806 in FIG. 8.

In step S907, the control unit A101 determines whether the operation for allowing the device registration has been performed in the image destination device. Specifically, the control unit A101 determines, by receiving the device registration allowance response from the image destination device, that the operation for allowing the device registration has been performed in the image destination device.

When the control unit A101 determines that the control unit has received the device registration allowance response from the image destination device through the short range wireless communication unit A112, the process goes to step S908. On the other hand, when the control unit A101 determines that the control unit has received the device registration rejection response from the image destination device through the short range wireless communication unit A112, or when the control unit has not received the device registration allowance response in a predetermined period of time, the control unit A101 terminates the process in the present flowchart.

In step S908, the control unit A101 controls the nonvolatile memory A103 to additionally record the device ID of the image destination device and the object information included in the captured image in the image destination correspondence table 700. The information additionally recorded at that time is used for specifying the image destination at the next time.

The operation of the digital camera A100 in the present embodiment has been described above.

Next, the operation of the smartphone for implementing the operation described above will be described in detail with reference to FIG. 10.

Figure 10:
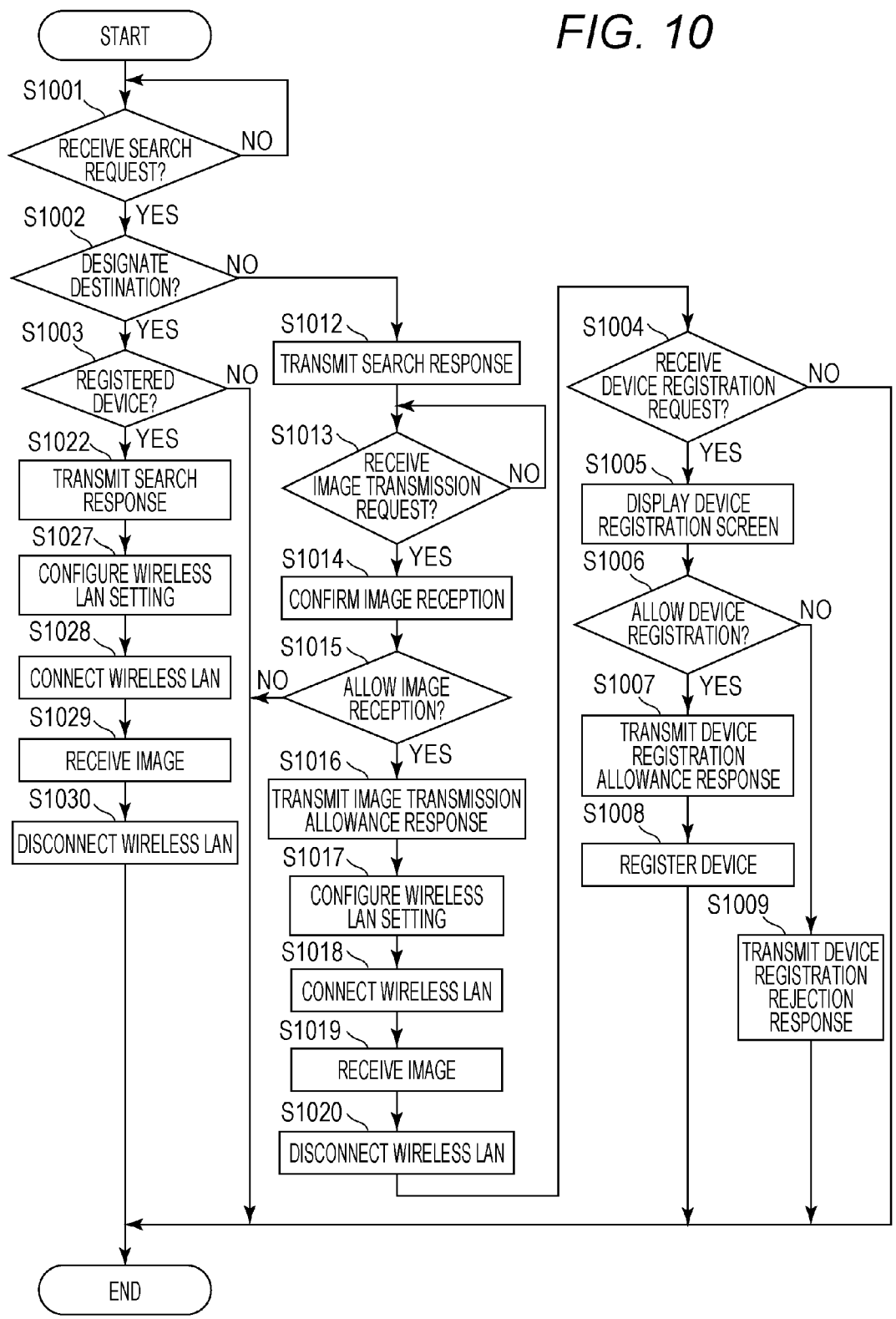
FIG. 10 is a flowchart of the operation of the smartphone according to the second embodiment.

FIG. 10 is a flowchart describing the process of the smartphone B100 in the present embodiment.

In step S1001, the control unit B101 determines whether the control unit has received the search request or the designated search request through the short range wireless communication unit B112. When the control unit B101 determines that the control unit has not received the designated search request, the process in the present step is repeated to wait for the reception of the search request or the designated search request. When the control unit B101 determines that the control unit has received the search request or the designated search request, the process goes to step S1002.

In step S1002, the control unit B101 determines whether the request received in step S1001 is a request of which destination has been designated. In other words, the control unit B101 determines whether the request is the designated search request.

First, the case in which the control unit B101 determines that the request received in step S1001 is the designated search request will be described. In that case, the process goes to step S1003.

In step S1003, the control unit B101 determines whether the device ID added to the designated search request received in step S1001 has been registered. The control unit B101 refers to the registered device ID list (not illustrated in the drawings) stored in the nonvolatile memory B103. When the device ID added to the designated search request is included in the list, the control unit B101 determines that the device ID has been registered. When the device ID added to the designated search request is not included in the list, the control unit B101 determines that the device ID has not been registered. When the device ID has been registered, the control unit B101 moves the process to step S1032. When the device ID has not been registered, the control unit B101 terminates the process for transmitting the image.

In step S1022, the same process as in step S502 in FIG. 5 is performed. In the next step S1027 to step S1030, the same processes as in step S507 to step S510 in FIG. 5 are performed.

The case in which it is determined in step S1002 that the request received in step S1001 is a designated search request has been described above.

Next, the case in which the control unit B101 determines in step S1002 that the request received in step S1001 is a search request will be described. In that case, the process goes to step S1012.

In step S1012 to step S1020, the same processes as in step S502 to step S510 in FIG. 5 are performed. After the completion of the process in step S1020, the process goes to step S1004.

In step S1004, the control unit B101 determines whether the control unit has received the device registration request in step S806 from the image source device through the short range wireless communication unit B112. When receiving the request described above in a predetermined period of time, the control unit B101 moves the process to step S1005. When not receiving the request described above in a predetermined period of time, the control unit B101 terminates the process for the device registration.

In step S1005, the control unit B101 displays the device registration window 620 as illustrated in FIG. 6E on the displaying unit B106. The control unit B101 controls the displaying unit B106 to superimpose and display the dialog box 621 for registering the image source device in the device registration window 620. The control unit B101 controls the displaying unit B106 to display the transmission source device information 622, the registration allowance icon 623, and the registration rejection icon 624 in the dialog box 621.

In step S1006, the control unit B101 determines whether the operation for allowing the device registration by the touch panel operation of the operating unit B105 has been performed.

When the control unit B101 determines that the registration rejection icon 624 has been selected, the process goes to step S1009. The control unit B101 transmits the device registration rejection response to the image source device and terminates the process in the present flowchart.

On the other hand, when the control unit B101 determines that the registration allowance icon 623 has been selected, the process goes to step S1007.

In step S1007, the control unit B101 transmits the device registration allowance response in step S809 to the image source device through the short range wireless communication unit B112.

In the next step S1008, the control unit B101 controls the nonvolatile memory B103 to additionally record the device ID of the image source device in the registered device ID list (not illustrated in the drawings). After that, the process in the present flowchart is terminated.

The operation of the smartphone B100 in the present embodiment has been described above.

As described above, the digital camera A100 in the present embodiment automatically determines the image destination device according to the captured image. This can save the user from having to select consciously the image destination device.

Note that the case in which, when recognizing the object specifies the image destination device (in other words, when the sequence goes to the sequence 851 in FIG. 8), the image is automatically transmitted without the confirmation as the transmission confirmation window 220 in FIG. 6B in the present embodiment has been described as an example. In light of that, for example, even when the destination device is specified, the peripheral device can be searched for as described in the sequence 852 such that the device specified as the destination is preferentially displayed from the searched devices. The device specified as the destination is displayed in a mode in which the device can be distinguished from the other devices, for example, a mode in which the color of the background of the device differs from those of the other devices, a mode in which the device is surrounded with a specific frame, or a mode in which the device has been selected. When many devices have been detected, there is a possibility that the destination list 222 is not fitted to the dialog box 221. In such a case, the destination list is preferably scrolled from side to side such that the detected devices can be recognized. In such a case, the list is displayed such that the device specified as the destination can be shown without scrolling so as to display the device in priority to the other devices. There is still a possibility that the devices specified as the destinations are not fitted to the dialog box 221. In such a case, displaying the devices in ascending order of the amount of scrolling operation required to display the device specified as the destination can display the device in priority to the other devices.

[Third Embodiment]

<Schematic System>

In the second embodiment, the case in which the image destination device is automatically determined according to the captured image has been described. On the other hand, in the present embodiment, the case in which the image destination device is automatically determined according to the setting of the image capture and the change of the setting of the image capture triggers the search for the image destination device will be described. When the transmission destination has been identified from the determination, the image is automatically transmitted. On the other hand, when the destination is unknown, the device registration for automatically determining the destination is performed, similarly to the second embodiment. In the present embodiment, the record size of the captured image will be described as an example of the image capture setting. Note that the present embodiment has many points in common with the first and second embodiments. Thus, unique points to the present embodiment will mainly be described.

The communication system in the present embodiment will schematically be described with reference to FIGS. 11 to 13.

Figure 11A:
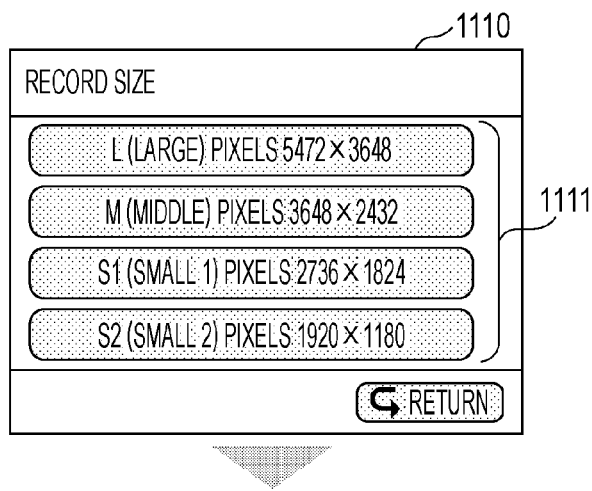
FIGS. 11A and 11B are diagrams of an exemplary screen displayed on the digital camera according to a third embodiment.
Figure 11B:
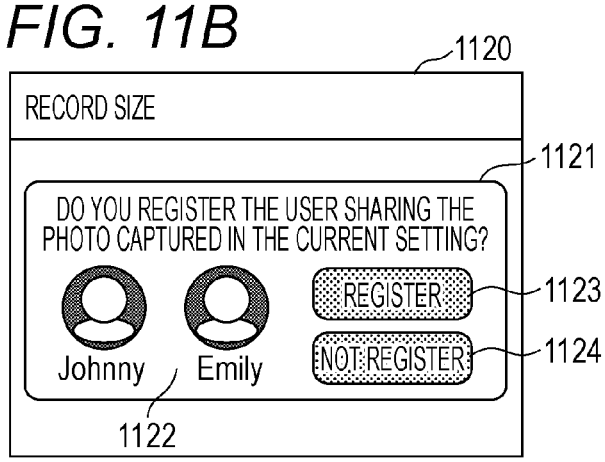
Figure 11C:
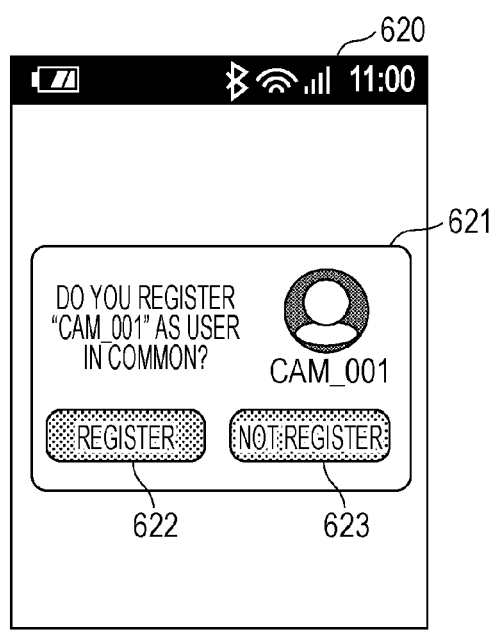
FIG. 11C is a diagram of an exemplary screen displayed on a smartphone according to the third embodiment.

FIG. 11 are exemplary GUIs displayed on the digital camera and the smartphone in order to implement the communication system in the present embodiment. FIGS. 11A and 11B are displayed on the displaying unit A106 of the digital camera A100. FIG. 11C is displayed on the displaying unit B106 of the smartphone B100. Note that the same contents as in FIG. 2 are marked with the same reference signs and the descriptions will be omitted.

FIG. 12 is exemplary information that is to be referred to when the digital camera A100 automatically determines the image destination device. The correspondence relationship between a device ID 1201 of the destination device of the captured image and the record size 1202 of the captured image is recorded in an image destination correspondence table 1200. The image destination correspondence table 1200 is stored in the nonvolatile memory A103.

Figure 13:
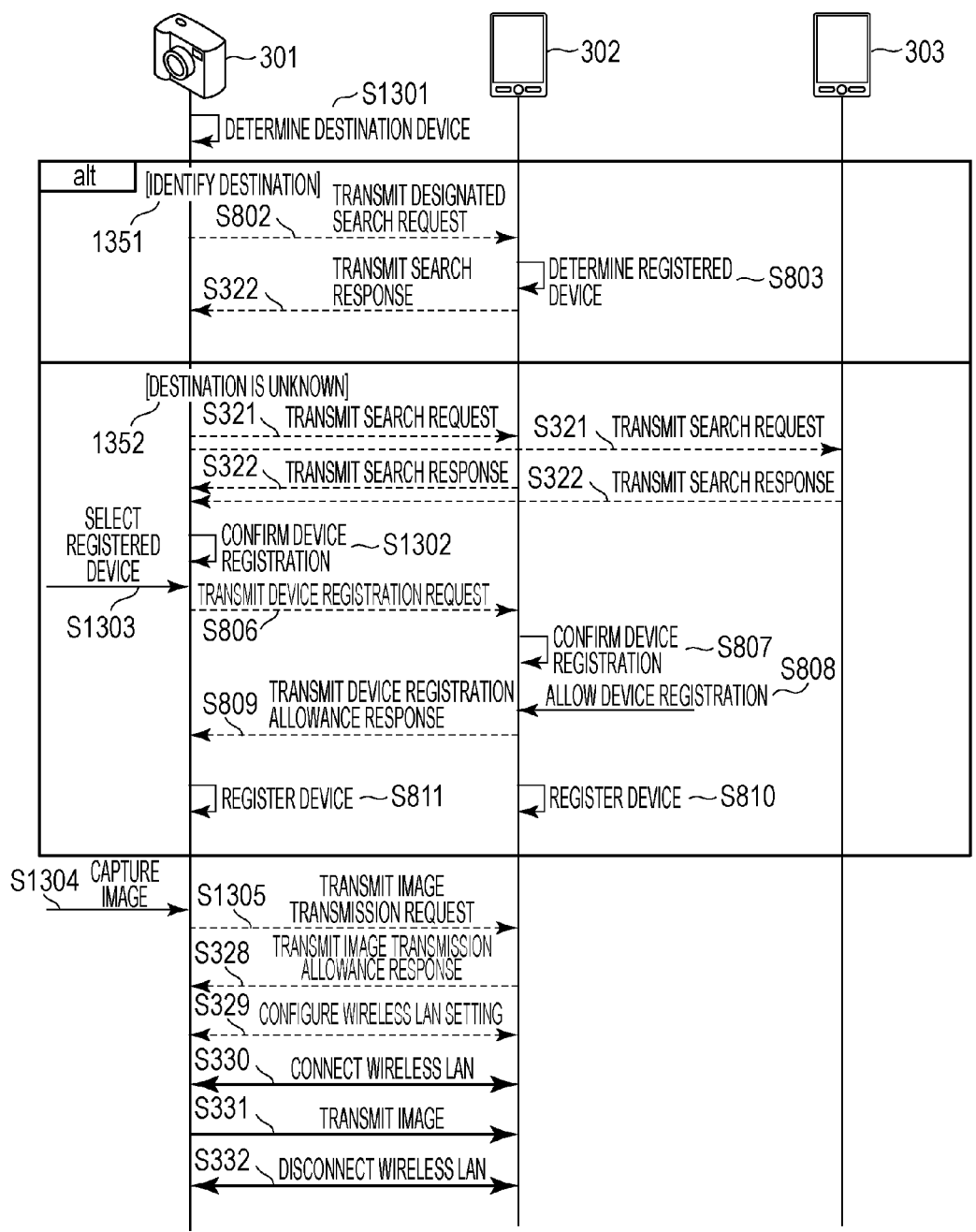
FIG. 13 is a diagram of the sequence describing the schematic procedure of the communication between the digital camera and smartphone according to the third embodiment.

FIG. 13 is a diagram of the sequence of the flow of the processes from the device search to the image transmission and the registration of the image destination device in the communication system according to the present embodiment.

When the operating unit A105 receives the menu operation intended for changing the record size of the captured image, the digital camera 301 displays a record size change screen 1110 as illustrated in FIG. 11A on the displaying unit A106. The digital camera 301 displays a size change icon 1111 in the record size change screen 1110.

When one of the size change icons 1111 has been selected by a touch panel operation of the operating unit A105, the digital camera 301 starts the sequence in FIG. 13.

The digital camera 301 determines the image destination device with reference to the changed record size and the image destination correspondence table 1200 (step S1301). For example, when the record size is set at "M", the digital camera 301 determines the device ID of the image destination device as "PHONE_001" from the image destination correspondence table 1200.

When the image destination device is determined as the result from the process in step S1301, the sequence goes to the sequence 1351. When the image destination device is unknown, the sequence goes to the sequence 1352.

The case in which the image destination device is identified (when the sequence goes to the sequence 1351) will be described first with an example in which the device determined as the destination is the smartphone 302.

The process in each device in such a case is the same as the process in the case in which the destination has been determined as described in FIG. 8. In other words, the digital camera 301 and the smartphone 302 perform the device search process in steps S802, S803, and S322.

The case in which the sequence goes to the sequence 1351 has been described above.

Next, the case in which the image destination device is unknown as the result from the process in step S1301 (when the sequence goes to the sequence 1352) will be described.

The digital camera 301 and the smartphones 302 and 303 perform the device search process in steps S321 and S322, similarly to in FIG. 3.

After the completion of the process in step S322, the digital camera 301 displays a device registration confirmation screen 1120 as illustrated in FIG. 11B on the displaying unit A106 (step S1302). The digital camera 301 displays a dialog box 1121 for registering the image destination device in the device registration confirmation screen 1120. The digital camera 301 displays the destination list 1122, a registration allowance icon 1123, and a registration rejection icon 1124 in the dialog box 1121. The destination list 1122 is displayed based on the information added to the search response.

When the registration allowance icon 1123 is selected while the operating unit A105 selects one or more registered devices from the destination list 1122 (step S1303), the digital camera 301 transmits the device registration request to the selected devices via Bluetooth (registered trademark). On the other hand, when the registration rejection icon 1124 is selected by the touch panel operation of the operating unit A105, the digital camera 301 terminates the device registration process.

Note that, in the present embodiment, the case in which the smartphone 302 is selected as the registered device will be described as an example.

After step S806, the digital camera 301 and the smartphone 302 perform the device registration process in steps S807 to S811.

The case in which the sequence goes to the sequence 1352 has been described above.

When the SW2 of the digital camera A100 is turned on after the sequence 1351 and the sequence 1352 (step S1304), the digital camera 301 transmits the image transmission request to the smartphone 302 via Bluetooth (registered trademark) (step S1305).

After step S1305, the digital camera 301 and the smartphone 302 perform the image transmission process in steps S328 to S332, similarly to in FIG. 3.

<Operation of Each Device>

Next, the operation of the digital camera for implementing the operation described above will be described in detail with reference to FIG. 14.

Figure 14:
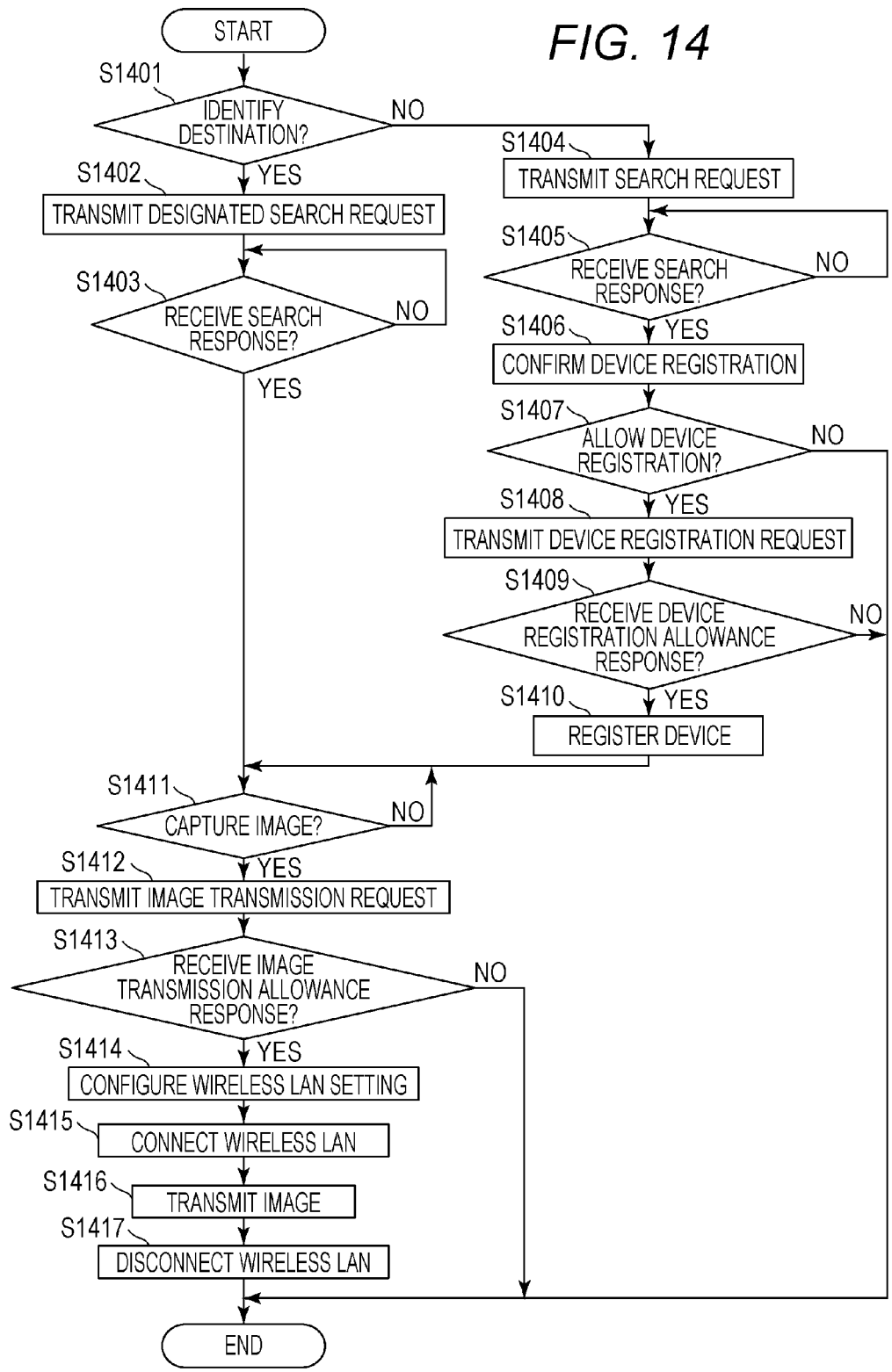
FIG. 14 is a flowchart of the operation of the digital camera according to the third embodiment.

FIG. 14 is a flowchart describing the process of the digital camera A100 in the present embodiment.

When one of the size change icons 1111 is selected by the touch panel operation of the operating unit A105, the control unit A101 starts the flowchart in FIG. 14.

First, in step S1401, the control unit A101 determines the image destination device with reference to the changed record size and the image destination correspondence table 1200. The process in step S1401 corresponds to the process in step S1301 in FIG. 13.

When the destination device is determined in step S1401, the process goes to step S1402. The same processes as in steps S902 and S903 in FIG. 9 are performed in steps S1402 and S1403. After that, the process goes to step S1411.

On the other hand, when the destination device is not determined in step S1401, the process goes to step S1404. The same processes in steps S911 and S912 in FIG. 9 are performed in steps S1404 and S1405.

Next, in step S1406, the control unit A101 displays the device registration confirmation screen 1120 as illustrated in FIG. 11B on the displaying unit A106. The control unit A101 controls the displaying unit A106 to display the dialog box 1121 for registering the image destination device in the device registration confirmation screen 1120. The control unit A101 controls the displaying unit A106 to display the destination list 1122, the registration allowance icon 1123, and the registration rejection icon 1124 in the dialog box 1121. The destination list 1122 is displayed based on the information added to the search response.

In step S1406, the control unit A101 determines whether the operating unit A105 has performed the operation for allowing the image destination device registration. When one or more registered devices are selected from the destination list 1122 and the registration allowance icon 1123 is further selected by the touch panel operation of the operating unit A105, the control unit A101 moves the process to step S1407. On the other hand, when the registration rejection icon 1124 is selected by the touch panel operation of the operating unit A105, the control unit A101 terminates the process in the present flowchart.

The same processes as in steps S906 to S908 in FIG. 9 are performed in steps S1407 to S1410. After that, the process goes to step S1411.

In step S1411, the control unit A101 determines whether the operating unit has received a shooting instruction. Specifically, the control unit A101 determines whether the release switch of the operating unit A105 is pressed and the SW2 is turned on. The control unit A101 determines that the shooting instruction has been received when the fact that the SW2 of the operating unit A105 is turned on has been detected.

When it is determined in step S1411 that the operating unit has not received the shooting instruction, the process in the present step is repeated to wait for a shooting instruction. On the other hand, when it is determined that the operating unit has received the shooting instruction, the process goes to step S1412.

In step S1412, the control unit A101 transmits the image transmission request to the image destination device through the short range wireless communication unit A112. After that, the process goes to step S1413.

The same processes as in steps S916 to S920 in FIG. 9 are performed in steps S1413 to S1417.

The operation of the digital camera A100 in the present embodiment has been described above.

Next, the operation of the smartphone for implementing the operation described above will be described in detail with reference to FIG. 15.

Figure 15:
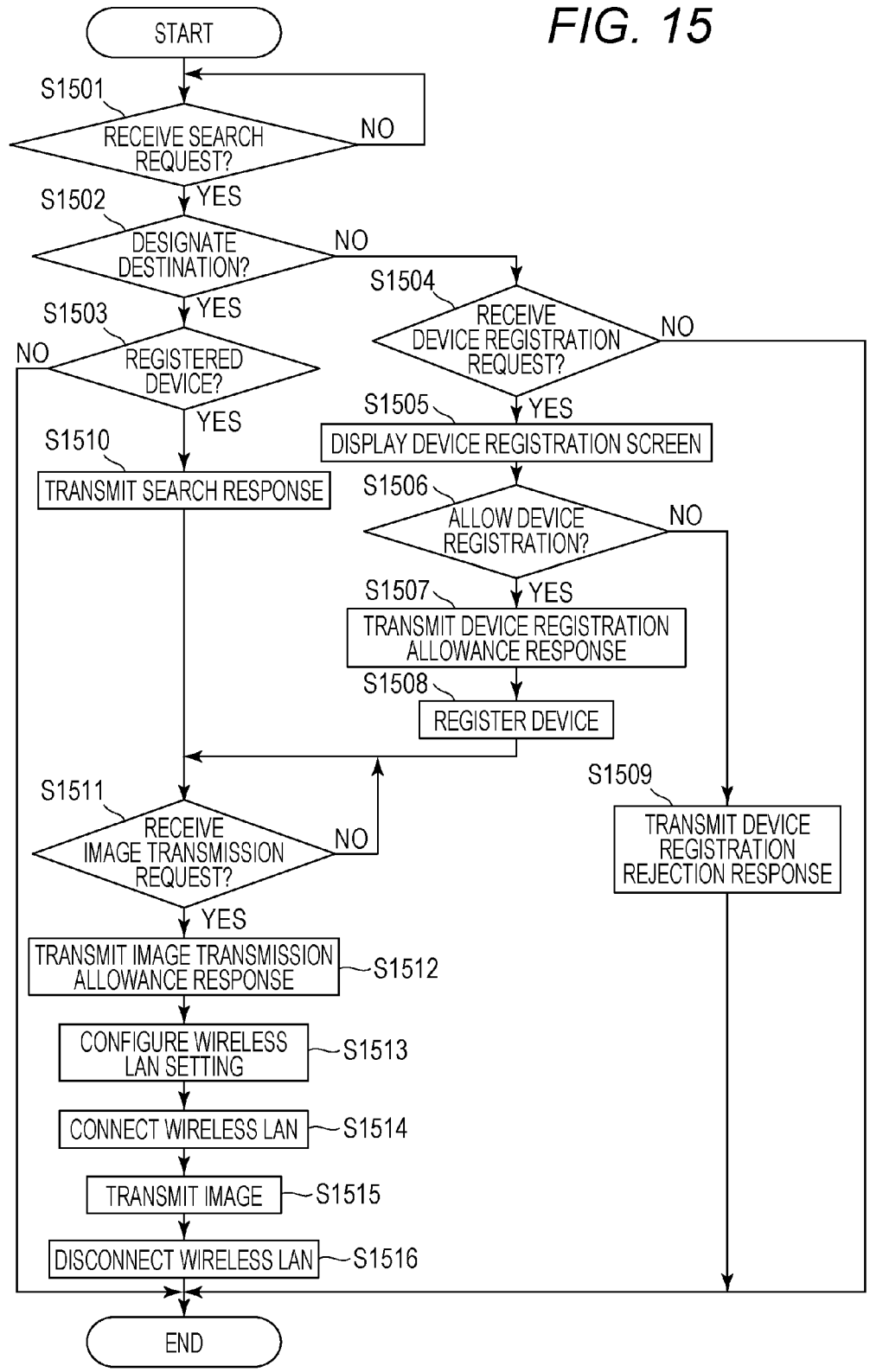
FIG. 15 is a flowchart of the operation of the smartphone according to the third embodiment.

FIG. 15 is a flowchart describing the process of the smartphone B100 in the present embodiment.

The same processes as in steps S1001 to S1003 in FIG. 10 are performed in steps S1501 to S1503. The same process as in step S1022 in FIG. 10 is performed in step S1510.

When it is determined in step S1502 that the request is a request of which destination has been designated, the process goes to step S1504.

The same processes as in steps S1004 to S1009 in FIG. 10 are performed in steps S1504 to S1509.

When the process in step S1510 or step S1509 is completed, the process goes to step S1511.

The same process as in step S1013 in FIG. 10 is performed in step S1511. When it is Yes in step S1511, the process goes to step S1512.

The same processes as in steps S1016 to S1020 in FIG. 10 are performed in steps S1512 to S1516.

The process of the smartphone B100 in the present embodiment has been described above.

As described above, the digital camera A100 in the present embodiment automatically determines the image destination device according to the image capture settings. The change of the image capture settings triggers the execution of the device search. This can save the user from having to consciously select the image destination device.

[Fourth Embodiment]

In the embodiment described above, the case in which a still image is generated according to a shooting instruction has been described as an example. On the other hand, in the present embodiment, the case in which the digital camera includes a consecutive shooting mode in which a plurality of still images is generated according to a shooting instruction will be described as an example.

Note that the present embodiment has many points in common with the first to third embodiments. Thus, unique points to the present embodiment will mainly be described.

The digital camera A100 in the present embodiment includes a consecutive shooting mode in which images are captured at given intervals of time while the SW2 is ON after the SW2 has been turned on. In the description below, relative to the consecutive shooting mode, a mode in which an image is generated once the SW2 has been turned on is referred to as a single shooting mode. The modes can be switched according to the user operation of the operating unit A105.

Figure 17:
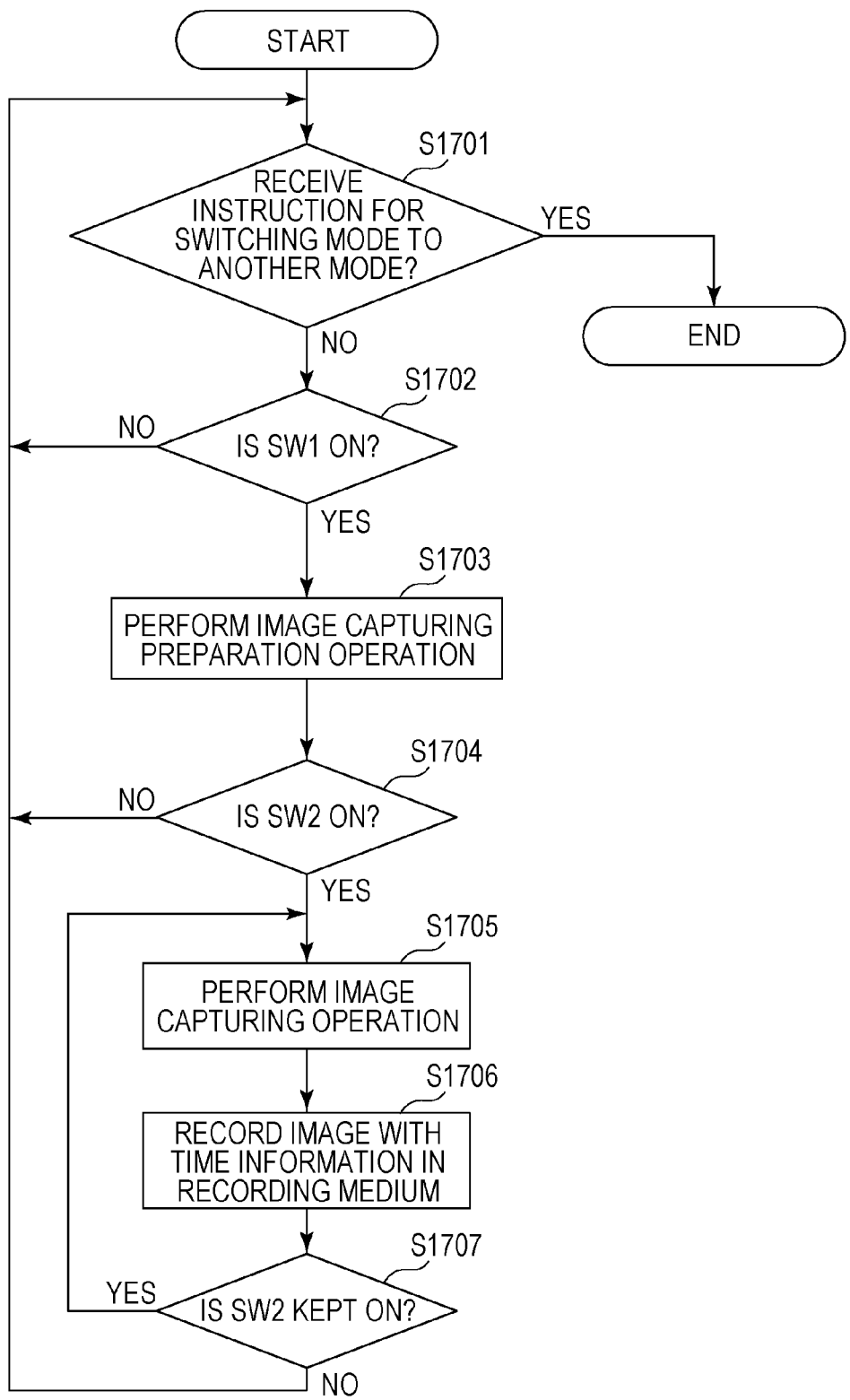
FIG. 17 is a flowchart of the operation of the digital camera in the consecutive shooting mode according to the fourth embodiment.

FIG. 17 is a flowchart describing of the operation of the digital camera A100 in the present embodiment. The present flowchart is started when the mode is switched to the consecutive shooting mode, for example, by the user operation.

The same processes as in steps S1601 to S1606 in FIG. 16 are performed in steps S1701 to S1706.

When the process in step S1606 is completed, the process goes to step S1607. Note that, if enough free space can be secured in the working memory A104 configured to temporarily store the image generated in step S1605, the processes in and after step S1607 can be performed in parallel to the process in step S1606 at the time of the completion of the process in step S1605.

In step S1607, the control unit A101 determines whether the SW2 is kept ON. When the control unit A101 determines that the SW2 is kept ON, the processes in steps S1705 to S1707 are repeated to capture the second and subsequent images. On the other hand, when the control unit A101 determines that the SW2 is OFF, the loop in steps S1705 to S1707 is terminated (in other words, the consecutive shooting is stopped) and the process goes back to step S1701.

The operation of the digital camera A100 in the consecutive shooting mode in the present embodiment has been described above.

Next, the timings of the starts of the destination device search process and the image transmission process in the present embodiment will be described. The destination device search process and image transmission process in the present embodiment are the same as in the first embodiment. It is the timings to start the processes in the present embodiment that is different from the first embodiment. In the present embodiment, the result from the determination in step S1707 is used as the trigger for the start of the flowchart in FIG. 4. In other words, the flowchart in FIG. 4 is not started not when the SW2 is turned on but when the SW2 is turned off from on. This is because there is a given period of time between the timing when the SW2 is turned on and the timing when the SW2 is turned off in the consecutive shooting mode. Thus, there is a possibility that the device that has existed in the range of communication via Bluetooth (registered trademark) at the timing when the SW2 has been turned on moves out of the communication range at the timing when the SW2 is turned off. In light of the foregoing, not the timing when the SW2 is turned on but the timing when the SW2 is turned off from on (namely, the timing of the completion of the consecutive shooting) is used as the trigger for the start of the flowchart in FIG. 4 in the present embodiment. Note that, in such a case, a series of images obtained in a consecutive shooting process is collectively transmitted in the flowchart in FIG. 4. In other words, a plurality of thumbnails of the images is transmitted in step S405. In step S409, a plurality of the main images is transmitted.

Other Embodiments

In the embodiments described above, the case in which a still image is generated in response to a shooting instruction has been described as an example. In addition to the embodiments, the digital camera can be configured to include a function to generate a moving image in response to a shooting instruction. Generally, separately from the release switch, a switch to give the instructions for capturing a moving image is provided on the digital camera such that the user can instruct the start of the photographing process for generating a moving image by pressing the switch. Then, the user can input the instructions to complete the photographing process for generating a moving image by pressing the switch again during the photographing process for generating a moving image. By the way, similarly to the case of the consecutive shooting, there is a given period of time between the timing of the start of the image capture and the timing of the completion in the case of the moving image capturing. Thus, similarly to the consecutive shooting, the timing of the completion of the image capture is used as the trigger for the start of the flowchart in FIG. 4 in the moving image capturing. This enables the start of the flowchart in FIG. 4 at an appropriate timing.

In addition to the embodiments described above, the digital camera A100 can be connected to the smartphone B100 via the wireless LAN so as to include a remote image capturing mode to receive the instructions for remote manipulation from the smartphone B100. In that case, the shooting instruction is input from the smartphone B100 to the digital camera A100 via a wireless LAN according to the operation of GUI of the smartphone B100 instead of the input on the digital camera A100. At that time, in consideration of the communication load, the process for transmitting a search request to the peripheral devices can be prevented because the digital camera has already been connected to the smartphone B100. On the other hand, when the shooting instruction is input from the smartphone B100, the digital camera A100 can transmit a search request to be connected to the smartphones other than the smartphone B100 in parallel. In that case, the smartphone B100 does not sends the search response back to the digital camera A100. This is because a digital camera generally has the configuration in which the image data captured by the digital camera A100 according to the remote shooting instruction from the smartphone B100 is transmitted to the smartphone B100 via a wireless LAN in the remote image capturing mode. In other word, it is not necessary in the relationship between the smartphone B100 and the digital camera A100 to perform the process in the embodiments described above. The destination list displayed as the result from the fact that the digital camera A100 has received the search response from another smartphone is transmitted to the smartphone B100 side via the wireless LAN such that the user of the smartphone B100 can select the destination. The information about the destination selected in the smartphone B100 is transmitted to the digital camera A100. This causes the digital camera A100 to perform the process for the connection to the other smartphone in parallel to the image transmission process.

In addition to the embodiments described above, the digital camera A100 can have a mode referred to as an interval shooting mode in which images are captured at predetermined intervals of time. Generally, in the interval shooting, the user often leaves the digital camera A100 and is away from the digital camera. In other words, even if the destination list is displayed at the timing when an image is captured, there is a high possibility that the user cannot select the destination. In light of the foregoing, a search response is not transmitted even at the timing when an image is captured in the interval shooting mode.

In the second embodiment, the example in which the image destination is specified based on the result of the recognition of the object in the captured image has been described. In light of that, for example, the digital camera can have a configuration to determine the image destination according to the type or the format (a moving image or a still image) of the content of the captured image.

In the third embodiment, the example in which the image destination is specified based on the record size of the captured image. However, the image destination can be specified according to another imaging parameter.

Even if both of the functions of Bluetooth (registered trademark) and the wireless LAN are valid, the user sometimes does not want to share images with others. In light of the foregoing, in addition to the embodiments described above, the user can set whether to use the function for transmitting an advertisement with the image capturing or the change of the settings by the user operation.

In the embodiments described above, every time a condition is satisfied, the communication parameter for the wireless LAN is shared via Bluetooth (registered trademark). In light of that, once a communication parameter for the wireless LAN is shared, it is efficient that the communication parameter is continuously used for other communications. In light of the foregoing, for example, when the condition under which a search request is broadcasted again is satisfied in a given period of time since the communication parameter has been shared, the wireless LAN connection is performed using the shared parameter. Note that it is not realistic in light of the energy consumption to keep both of the devices constantly connected to each other via the wireless LAN. Thus, the broadcast of the search request is used not for sharing the parameter but for controlling the timing of the connection via the wireless LAN.

The above-described exemplary embodiments can more readily and flexibly implement a series of processes from the image capture to the image transmission.

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2013-223527, filed Oct. 28, 2013, which is hereby incorporated by reference herein in its entirety.

What is claimed is:

1. An image device comprising:
    an image capturing unit configured to capture an image in response to a shooting instruction;
    a first communication interface configured to connect the image device to an external device;
    a second communication interface configured to share, with the external device, a communication parameter used for connecting via the first communication interface the image device to the external device; and
    a control unit configured to start a process for sharing the communication parameter with the external device using the second communication interface in response to the shooting instruction,
    wherein, in a case where the process for sharing the communication parameter is started, the control unit transmits a thumbnail of the image captured with the image capturing unit to the external device via the second communication interface and transmits the image captured with the image capturing unit to the external device via the first communication interface,
    wherein communication performed via the second communication interface consumes lower power than communication performed via the first communication interface, and
    wherein, in a case where the process for sharing the communication parameter is started, the control unit transmits the thumbnail of the image captured with the image capturing unit to the external device via the second communication interface before establishing communication with the external device via the first communication interface.

2. The image device according to claim 1,
    wherein the control unit starts the process for sharing after a completion of the image capturing.

3. The image device according to claim 2,
    wherein, when images are consecutively captured, the control unit starts the process for sharing after a completion of the consecutive image capturing.

4. The image device according to claim 1,
    wherein a request for starting a process for sharing the communication parameter via the second communication interface is broadcasted.

5. The image device according to claim 4,
    wherein the communication parameter is shared with a device selected by a user of the image device from among devices that have responded to the request.

6. The image device according to claim 5,
    wherein the communication parameter is shared with a device that has returned a connection allowance response from among the devices selected by the user.

7. The image device according to claim 5,
    wherein a thumbnail of the image captured with the image capturing unit is transmitted to the device selected by the user via the second communication interface.

8. The image device according to claim 1, further comprising:
    an operation member configured to receive a shooting instruction according to an operation from a user.

9. The image device according to claim 1, wherein the control unit receives via the second communication interface a request for starting to share the communication parameter from the external device.

10. The image device according to claim 1,
    wherein the control unit shares the communication parameter with an external device corresponding to information about an object determined based on the captured image among two or more external devices.

11. The image device according to claim 1,
    wherein the first communication interface has a higher communication rate, a longer communication range, or a higher energy consumption per hour than the second communication interface.

12. A method for controlling an image device having a first communication interface and a second communication interface different from the first communication interface, the method comprising:
    capturing an image in response to a shooting instruction;
    sharing a communication parameter with an external device via the second communication interface, the communication parameter being used for connecting via the first communication interface the image device to the external device;
    starting a process for sharing the communication parameter with the external device using the second communication interface in response to the shooting instruction; and
    transmitting, in a case where the process for sharing the communication parameter is started, a thumbnail of the image captured with the image capturing unit to the external device via the second communication interface, and transmitting the image captured with the image capturing unit to the external device via the first communication interface, wherein communication performed via the second communication interface consumes lower power than communication performed via the first communication interface, and wherein, in a case where the process for sharing the communication parameter is started, the thumbnail of the captured image is transmitted to the external device via the second communication interface before establishing communication with the external device via the first communication interface.

13. A non-transitory computer-readable storage medium storing a program wherein the program causes an image device to perform a method for controlling an image device having a first communication interface and a second communication interface different from the first communication interface, the method comprising:

capturing an image in response to a shooting instruction;

sharing a communication parameter with an external device via the second communication interface, the communication parameter being used for connecting via the first communication interface the image device to the external device;

starting a process for sharing the communication parameter with the external device in response to the shooting instruction; and transmitting, in a case where the process for sharing the communication parameter is started, a thumbnail of the image captured with the image capturing unit to the external device via the second communication interface, and transmitting the image captured with the image capturing unit to the external device via the first communication interface, wherein communication performed via the second communication interface consumes lower power than communication performed via the first communication interface, and wherein, in a case where the process for sharing the communication parameter is started, the thumbnail of the captured image is transmitted to the external device via the second communication interface before establishing communication with the external device via the first communication interface.

14. The image device according to claim 1, wherein, in a case where the process for sharing the communication parameter is started, the control unit transmits the thumbnail of the image captured with the image capturing unit to the external device via the second communication interface before sharing the communication parameter with the external device.

15. The image device according to claim 1, wherein, in a case where the process for sharing the communication parameter is started, the control unit transmits the thumbnail of the image captured with the image capturing unit to the external device via the second communication interface before transmitting the image captured with the image capturing unit to the external device via the first communication interface.

16. The image device according to claim 1, wherein, in a case where the image captured with the image capturing unit has been transmitted to the external device via the first communication interface, the control unit disconnects the communication established with the external device via the first communication interface.

* * * * *